(12) United States Patent
Kosaka

(10) Patent No.: US 9,063,717 B2
(45) Date of Patent: Jun. 23, 2015

(54) POWER SUPPLY APPARATUS AND IMAGE FORMATION APPARATUS

(75) Inventor: Toru Kosaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 454 days.

(21) Appl. No.: 13/524,009

(22) Filed: Jun. 15, 2012

(65) Prior Publication Data

US 2012/0323383 A1 Dec. 20, 2012

(30) Foreign Application Priority Data

Jun. 17, 2011 (JP) .................................. 2011-135240

(51) Int. Cl.

| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H01L 41/00 | (2013.01) |
| H02N 2/00 | (2006.01) |
| G05F 3/06 | (2006.01) |
| G03G 15/20 | (2006.01) |
| H03L 7/06 | (2006.01) |
| G06F 1/26 | (2006.01) |
| H02J 3/00 | (2006.01) |
| G06Q 50/06 | (2012.01) |

(52) U.S. Cl.
CPC ... *G06F 1/26* (2013.01); *H02J 3/00* (2013.01); *G06Q 50/06* (2013.01)

(58) Field of Classification Search
CPC .... H01L 41/044; G06F 1/26; G03G 15/2039; G03G 15/5004; H05B 41/2822; H05B 41/3925; H05B 41/2855; H03K 5/1565; G11C 11/4076; G11C 7/222; H03L 7/08; H03L 7/0818; H02M 3/28
USPC ............... 700/286; 310/316, 318; 399/69, 88; 327/158, 149; 219/216
See application file for complete search history.

(56) References Cited

U.S. PATENT DOCUMENTS

| | | | | |
|---|---|---|---|---|
| 6,407,480 | B1 * | 6/2002 | Nakanishi et al. | 310/316.01 |
| 8,659,921 | B2 * | 2/2014 | Buchwald et al. | 363/75 |
| 2003/0098861 | A1 * | 5/2003 | Nakatsuka et al. | 345/212 |
| 2007/0200455 | A1 * | 8/2007 | Yamaguchi | 310/318 |

FOREIGN PATENT DOCUMENTS

JP 2007-189880 A 7/2007

* cited by examiner

*Primary Examiner* — Mohammad Ali
*Assistant Examiner* — Md Azad
(74) *Attorney, Agent, or Firm* — Marvin A. Motsenbocker; Mots Law, PLLC

(57) ABSTRACT

A power supply apparatus includes an arithmetic unit configured to successively update a N-bit division ratio at every step whose processing timing is managed by a timer, by adding or subtracting of preset data read from a data memory to or from the N-bit division ratio in accordance with a comparative output. An arithmetic unit performs an arithmetic operation to make a feedback data value approach a target data value by a negative feedback control, the arithmetic operation using, as the preset data, data read from the address specified by data with a predetermined bit width of M (M<N) extracted from the successively updated N-bit division ratio.

25 Claims, 20 Drawing Sheets

FIG. 7

INPUT AND OUTPUT VALUES OF MEMORY 460 (1)

| INPUT VALUE 8bit | OUTPUT VALUE 9bit | INPUT VALUE 8bit | OUTPUT VALUE 9bit | INPUT VALUE 8bit | OUTPUT VALUE 9bit | INPUT VALUE 8bit | OUTPUT VALUE 9bit | INPUT VALUE 8bit | OUTPUT VALUE 9bit |
|---|---|---|---|---|---|---|---|---|---|
| 00hex | 1FFhex | 20hex | 015hex | 40hex | 1FFhex | 60hex | 1FFhex | 80hex | 1FFhex |
| 01hex | 1FFhex | 21hex | 00Ehex | 41hex | 1FFhex | 61hex | 1FFhex | 81hex | 1FFhex |
| 02hex | 1FFhex | 22hex | 00Ehex | 42hex | 1FFhex | 62hex | 1FFhex | 82hex | 1FFhex |
| 03hex | 1FFhex | 23hex | 00Bhex | 43hex | 1FFhex | 63hex | 1FFhex | 83hex | 1FFhex |
| 04hex | 1FFhex | 24hex | 00Ahex | 44hex | 1FFhex | 64hex | 1FFhex | 84hex | 1FFhex |
| 05hex | 1FFhex | 25hex | 007hex | 45hex | 1FFhex | 65hex | 1FFhex | 85hex | 1FFhex |
| 06hex | 1FFhex | 26hex | 006hex | 46hex | 1FFhex | 66hex | 1FFhex | 86hex | 1FFhex |
| 07hex | 1FFhex | 27hex | 005hex | 47hex | 1FFhex | 67hex | 1FFhex | 87hex | 1FFhex |
| 08hex | 1FFhex | 28hex | 004hex | 48hex | 1FFhex | 68hex | 1FFhex | 88hex | 1FFhex |
| 09hex | 1FFhex | 29hex | 003hex | 49hex | 1FFhex | 69hex | 1FFhex | 89hex | 1FFhex |
| 0Ahex | 1FFhex | 2Ahex | 002hex | 4Ahex | 1FFhex | 6Ahex | 1FFhex | 8Ahex | 1FFhex |
| 0Bhex | 1FFhex | 2Bhex | 002hex | 4Bhex | 1FFhex | 6Bhex | 1FFhex | 8Bhex | 1FFhex |
| 0Chex | 1FFhex | 2Chex | 002hex | 4Chex | 1FFhex | 6Chex | 1FFhex | 8Chex | 1FFhex |
| 0Dhex | 1FFhex | 2Dhex | 002hex | 4Dhex | 1FFhex | 6Dhex | 1FFhex | 8Dhex | 155hex |
| 0Ehex | 1FFhex | 2Ehex | 002hex | 4Ehex | 1FFhex | 6Ehex | 1FFhex | 8Ehex | 155hex |
| 0Fhex | 1FFhex | 2Fhex | 002hex | 4Fhex | 1FFhex | 6Fhex | 1FFhex | 8Fhex | 155hex |
| 10hex | 1FFhex | 30hex | 002hex | 50hex | 1FFhex | 70hex | 1FFhex | 90hex | 155hex |
| 11hex | 1FFhex | 31hex | 002hex | 51hex | 1FFhex | 71hex | 1FFhex | 91hex | 100hex |
| 12hex | 1FFhex | 32hex | 002hex | 52hex | 1FFhex | 72hex | 1FFhex | 92hex | 0CDhex |
| 13hex | 1FFhex | 33hex | 003hex | 53hex | 1FFhex | 73hex | 1FFhex | 93hex | 0ABhex |
| 14hex | 1FFhex | 34hex | 1FFhex | 54hex | 1FFhex | 74hex | 1FFhex | 94hex | 0CDhex |
| 15hex | 066hex | 35hex | 1FFhex | 55hex | 1FFhex | 75hex | 1FFhex | 95hex | 100hex |
| 16hex | 033hex | 36hex | 1FFhex | 56hex | 1FFhex | 76hex | 1FFhex | 96hex | 0ABhex |
| 17hex | 033hex | 37hex | 1FFhex | 57hex | 1FFhex | 77hex | 1FFhex | 97hex | 092hex |
| 18hex | 033hex | 38hex | 1FFhex | 58hex | 1FFhex | 78hex | 1FFhex | 98hex | 092hex |
| 19hex | 033hex | 39hex | 1FFhex | 59hex | 1FFhex | 79hex | 1FFhex | 99hex | 155hex |
| 1Ahex | 033hex | 3Ahex | 1FFhex | 5Ahex | 1FFhex | 7Ahex | 1FFhex | 9Ahex | 100hex |
| 1Bhex | 033hex | 3Bhex | 1FFhex | 5Bhex | 1FFhex | 7Bhex | 1FFhex | 9Bhex | 100hex |
| 1Chex | 029hex | 3Chex | 1FFhex | 5Chex | 1FFhex | 7Chex | 1FFhex | 9Chex | 080hex |
| 1Dhex | 029hex | 3Dhex | 1FFhex | 5Dhex | 1FFhex | 7Dhex | 1FFhex | 9Dhex | 0CDhex |
| 1Ehex | 01Dhex | 3Ehex | 1FFhex | 5Ehex | 1FFhex | 7Ehex | 1FFhex | 9Ehex | 0ABhex |
| 1Fhex | 017hex | 3Fhex | 1FFhex | 5Fhex | 1FFhex | 7Fhex | 1FFhex | 9Fhex | 0ABhex |

FIG. 8

INPUT AND OUTPUT VALUES OF MEMORY 460 (2)

| INPUT VALUE 8bit | OUTPUT VALUE 9bit | INPUT VALUE 8bit | OUTPUT VALUE 9bit | INPUT VALUE 8bit | OUTPUT VALUE 9bit |
|---|---|---|---|---|---|
| A0hex | 0CDhex | C0hex | 006hex | E0hex | 1FFhex |
| A1hex | 0CDhex | C1hex | 005hex | E1hex | 1FFhex |
| A2hex | 080hex | C2hex | 004hex | E2hex | 1FFhex |
| A3hex | 072hex | C3hex | 003hex | E3hex | 1FFhex |
| A4hex | 072hex | C4hex | 002hex | E4hex | 1FFhex |
| A5hex | 072hex | C5hex | 002hex | E5hex | 1FFhex |
| A6hex | 05Dhex | C6hex | 002hex | E6hex | 1FFhex |
| A7hex | 05Dhex | C7hex | 001hex | E7hex | 1FFhex |
| A8hex | 05Dhex | C8hex | 001hex | E8hex | 1FFhex |
| A9hex | 05Dhex | C9hex | 001hex | E9hex | 1FFhex |
| AAhex | 04Fhex | CAhex | 002hex | EAhex | 1FFhex |
| ABhex | 05Dhex | CBhex | 00Ahex | EBhex | 1FFhex |
| AChex | 044hex | CChex | 1FFhex | EChex | 1FFhex |
| ADhex | 040hex | CDhex | 1FFhex | EDhex | 1FFhex |
| AEhex | 040hex | CEhex | 1FFhex | EEhex | 1FFhex |
| AFhex | 029hex | CFhex | 1FFhex | EFhex | 1FFhex |
| B0hex | 02Bhex | D0hex | 1FFhex | F0hex | 1FFhex |
| B1hex | 040hex | D1hex | 1FFhex | F1hex | 1FFhex |
| B2hex | 02Chex | D2hex | 1FFhex | F2hex | 1FFhex |
| B3hex | 033hex | D3hex | 1FFhex | F3hex | 1FFhex |
| B4hex | 025hex | D4hex | 1FFhex | F4hex | 1FFhex |
| B5hex | 023hex | D5hex | 1FFhex | F5hex | 1FFhex |
| B6hex | 01Chex | D6hex | 1FFhex | F6hex | 1FFhex |
| B7hex | 01Bhex | D7hex | 1FFhex | F7hex | 1FFhex |
| B8hex | 01Ahex | D8hex | 1FFhex | F8hex | 180hex |
| B9hex | 014hex | D9hex | 1FFhex | F9hex | 115hex |
| BAhex | 015hex | DAhex | 1FFhex | FAhex | 115hex |
| BBhex | 00Fhex | DBhex | 1FFhex | FBhex | 115hex |
| BChex | 00Ehex | DChex | 1FFhex | FChex | 1CChex |
| BDhex | 00Chex | DDhex | 1FFhex | FDhex | 132hex |
| BEhex | 009hex | DEhex | 1FFhex | FEhex | 132hex |
| BFhex | 008hex | DFhex | 1FFhex | FFhex | 132hex |

FIG. 9

OUTPUT CHARACTERISTIC OF PIEZOELECTRIC TRANSFORMER 208

| DIVISION RATIO 19bit | OUTPUT VOLTAGE (V) | DIVISION RATIO 19bit | OUTPUT VOLTAGE (V) | DIVISION RATIO 19bit | OUTPUT VOLTAGE (V) |
|---|---|---|---|---|---|
| 60000hex | 54 | 68000hex | 170 | 70000hex | 1180 |
| 60400hex | 56 | 68400hex | 175 | 70400hex | 1340 |
| 60800hex | 58 | 68800hex | 180 | 70800hex | 1550 |
| 60C00hex | 60 | 68C00hex | 188 | 70C00hex | 1830 |
| 61000hex | 62 | 69000hex | 197 | 71000hex | 2190 |
| 61400hex | 64 | 69400hex | 206 | 71400hex | 2680 |
| 61800hex | 66 | 69800hex | 215 | 71800hex | 3320 |
| 61C00hex | 68 | 69C00hex | 226 | 71C00hex | 4000 |
| 62000hex | 70 | 6A000hex | 237 | 72000hex | 4900 |
| 62400hex | 72 | 6A400hex | 248 | 72400hex | 5810 |
| 62800hex | 74 | 6A800hex | 259 | 72800hex | 6510 |
| 62C00hex | 76 | 6AC00hex | 272 | 72C00hex | 7150 |
| 63000hex | 78 | 6B000hex | 283 | 73000hex | 7250 |
| 63400hex | 80 | 6B400hex | 298 | 73400hex | 4100 |
| 63800hex | 83 | 6B800hex | 314 | 73800hex | 2600 |
| 63C00hex | 86 | 6BC00hex | 330 | 73C00hex | 2010 |
| 64000hex | 89 | 6C000hex | 355 | 74000hex | 1660 |
| 64400hex | 92 | 6C400hex | 379 | 74400hex | 1430 |
| 64800hex | 96 | 6C800hex | 395 | 74800hex | 1230 |
| 64C00hex | 100 | 6CC00hex | 418 | 74C00hex | 1110 |
| 65000hex | 105 | 6D000hex | 438 | 75000hex | 1000 |
| 65400hex | 111 | 6D400hex | 466 | 75400hex | 910 |
| 65800hex | 116 | 6D800hex | 495 | 75800hex | 835 |
| 65C00hex | 120 | 6DC00hex | 532 | 75C00hex | 770 |
| 66000hex | 126 | 6E000hex | 570 | 76000hex | 718 |
| 66400hex | 133 | 6E400hex | 610 | 76400hex | 678 |
| 66800hex | 140 | 6E800hex | 662 | 76800hex | 628 |
| 66C00hex | 143 | 6EC00hex | 710 | 76C00hex | 582 |
| 67000hex | 147 | 6F000hex | 780 | 77000hex | 550 |
| 67400hex | 151 | 6F400hex | 854 | | |
| 67800hex | 159 | 6F800hex | 942 | | |
| 67C00hex | 164 | 6FC00hex | 1050 | | |

FIG. 10

OUTPUT CHARACTERISTIC OF PIEZOELECTRIC TRANSFORMER 204

| DIVISION RATIO 19bit | OUTPUT VOLTAGE (V) | DIVISION RATIO 19bit | OUTPUT VOLTAGE (V) |
|---|---|---|---|
| 45400hex | 220 | 4D000hex | 2300 |
| 45800hex | 230 | 4D400hex | 1650 |
| 45C00hex | 250 | 4D800hex | 1380 |
| 46000hex | 270 | 4DC00hex | 1210 |
| 46400hex | 290 | 4E000hex | 1120 |
| 46800hex | 310 | 4E400hex | 1010 |
| 46C00hex | 330 | 4E800hex | 918 |
| 47000hex | 350 | 4EC00hex | 849 |
| 47400hex | 375 | 4F000hex | 788 |
| 47800hex | 400 | 4F400hex | 731 |
| 47C00hex | 435 | 4F800hex | 683 |
| 48000hex | 480 | 4FC00hex | 640 |
| 48400hex | 528 | 50000hex | 598 |
| 48800hex | 600 | 50400hex | 563 |
| 48C00hex | 670 | 50800hex | 534 |
| 49000hex | 760 | 50C00hex | 501 |
| 49400hex | 860 | | |
| 49800hex | 1000 | | |
| 49C00hex | 1180 | | |
| 4A000hex | 1380 | | |
| 4A400hex | 1650 | | |
| 4A800hex | 2010 | | |
| 4AC00hex | 2460 | | |
| 4B000hex | 3020 | | |
| 4B400hex | 3630 | | |
| 4B800hex | 4260 | | |
| 4BC00hex | 4870 | | |
| 4C000hex | 5460 | | |
| 4C400hex | 5980 | | |
| 4C800hex | 6400 | | |
| 4CC00hex | 6700 | | |

(A00-09): 10 LEAST SIGNIFICANT BIT VALUE OF 19-bit REGISTER
(G00-09): 10-bit VALUE OF ERROR HOLDING REGISTER

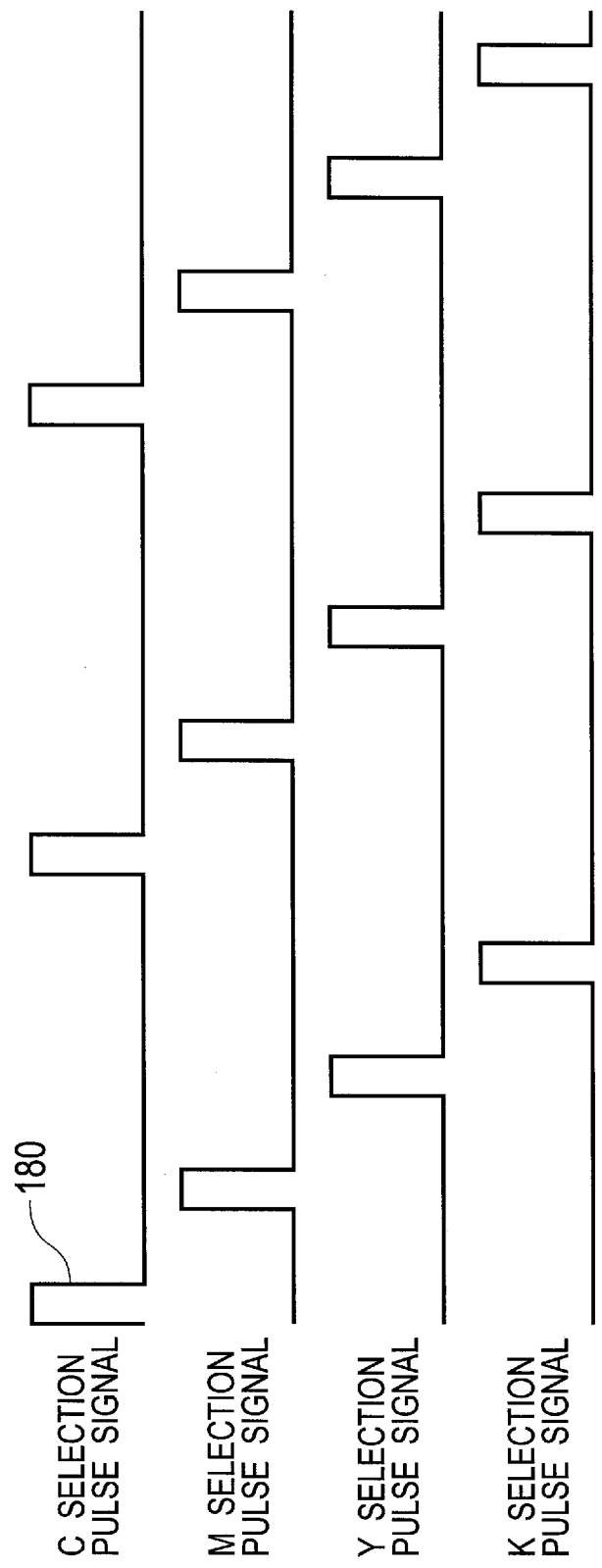

FIG. 14

CALCULATION EXAMPLE OF CONTROL-STEP-VALUE FOR PIEZOELECTRIC TRANSFORMER 208 (1)

| DIVISION RATIO, 9 MOST SIGNIFICANT BITS | ADDRESS (8-bit) | DRIVE FREQUENCY (Hz) | OUTPUT VOLTAGE (V) | AMOUNT OF CHANGE IN OUTPUT VOLTAGE (DIFFERENCE FROM NEXT ROW) | VALUE FOR 1-V CHANGE (19-bit) | HEX DISPLAY |
|---|---|---|---|---|---|---|
| 180 | 80 | 130.2 | 54 | 2 | 512 | 1FF |
| 181 | 81 | 129.9 | 56 | 2 | 512 | 1FF |
| 182 | 82 | 129.5 | 58 | 2 | 512 | 1FF |
| 183 | 83 | 129.2 | 60 | 2 | 512 | 1FF |
| 184 | 84 | 128.9 | 62 | 2 | 512 | 1FF |
| 185 | 85 | 128.5 | 64 | 2 | 512 | 1FF |
| 186 | 86 | 128.2 | 66 | 2 | 512 | 1FF |
| 187 | 87 | 127.9 | 68 | 2 | 512 | 1FF |
| 188 | 88 | 127.6 | 70 | 2 | 512 | 1FF |
| 189 | 89 | 127.2 | 72 | 2 | 512 | 1FF |
| 18A | 8A | 126.9 | 74 | 2 | 512 | 1FF |
| 18B | 8B | 126.6 | 76 | 2 | 512 | 1FF |
| 18C | 8C | 126.3 | 78 | 2 | 512 | 1FF |
| 18D | 8D | 125.9 | 80 | 3 | 341 | 155 |
| 18E | 8E | 125.6 | 83 | 3 | 341 | 155 |
| 18F | 8F | 125.3 | 86 | 3 | 341 | 155 |
| 190 | 90 | 125.0 | 89 | 3 | 341 | 155 |
| 191 | 91 | 124.7 | 92 | 4 | 256 | 100 |
| 192 | 92 | 124.4 | 96 | 4 | 256 | 100 |
| 193 | 93 | 124.1 | 100 | 5 | 205 | CD |
| 194 | 94 | 123.8 | 105 | 6 | 171 | AB |
| 195 | 95 | 123.5 | 111 | 5 | 205 | CD |
| 196 | 96 | 123.2 | 116 | 4 | 256 | 100 |
| 197 | 97 | 122.9 | 120 | 6 | 171 | AB |
| 198 | 98 | 122.5 | 126 | 7 | 146 | 92 |
| 199 | 99 | 122.2 | 133 | 7 | 146 | 92 |
| 19A | 9A | 122.0 | 140 | 3 | 341 | 155 |
| 19B | 9B | 121.7 | 143 | 4 | 256 | 100 |
| 19C | 9C | 121.4 | 147 | 4 | 256 | 100 |
| 19D | 9D | 121.1 | 151 | 8 | 128 | 80 |
| 19E | 9E | 120.8 | 159 | 5 | 205 | CD |
| 19F | 9F | 120.5 | 164 | 6 | 171 | AB |
| 1A0 | A0 | 120.2 | 170 | 5 | 205 | CD |
| 1A1 | A1 | 119.9 | 175 | 5 | 205 | CD |
| 1A2 | A2 | 119.6 | 180 | 8 | 128 | 80 |
| 1A3 | A3 | 119.3 | 188 | 9 | 144 | 72 |
| 1A4 | A4 | 119.0 | 197 | 9 | 144 | 72 |
| 1A5 | A5 | 118.8 | 206 | 9 | 144 | 72 |
| 1A6 | A6 | 118.5 | 215 | 11 | 93 | 5D |
| 1A7 | A7 | 118.2 | 226 | 11 | 93 | 5D |
| 1A8 | A8 | 117.9 | 237 | 11 | 93 | 5D |
| 1A9 | A9 | 117.6 | 248 | 11 | 93 | 5D |
| 1AA | AA | 117.4 | 259 | 13 | 79 | 4F |
| 1AB | AB | 117.1 | 272 | 11 | 93 | 5D |
| 1AC | AC | 116.8 | 283 | 15 | 68 | 44 |
| 1AD | AD | 116.6 | 298 | 16 | 64 | 40 |
| 1AE | AE | 116.3 | 314 | 16 | 64 | 40 |
| 1AF | AF | 116.0 | 330 | 25 | 41 | 29 |
| 1B0 | B0 | 115.7 | 355 | 24 | 43 | 2B |
| 1B1 | B1 | 115.5 | 379 | 16 | 64 | 40 |
| 1B2 | B2 | 115.2 | 395 | 23 | 44 | 2C |

FIG. 15

CALCULATION EXAMPLE OF CONTROL-STEP-VALUE FOR PIEZOELECTRIC TRANSFORMER 208 (2)

| DIVISION RATIO, 9 MOST SIGNIFICANT BITS | ADDRESS (8-bit) | DRIVE FREQUENCY (Hz) | OUTPUT VOLTAGE (V) | AMOUNT OF CHANGE IN OUTPUT VOLTAGE (DIFFERENCE FROM NEXT ROW) | VALUE FOR 1-V CHANGE (19-bit) | HEX DISPLAY |
|---|---|---|---|---|---|---|
| 1B3 | B3 | 114.9 | 418 | 20 | 51 | 33 |
| 1B4 | B4 | 114.7 | 438 | 28 | 37 | 25 |
| 1B5 | B5 | 114.4 | 466 | 29 | 35 | 23 |
| 1B6 | B6 | 114.2 | 495 | 37 | 28 | 1C |
| 1B7 | B7 | 113.9 | 532 | 38 | 27 | 1B |
| 1B8 | B8 | 113.6 | 570 | 40 | 26 | 1A |
| 1B9 | B9 | 113.4 | 610 | 52 | 20 | 14 |
| 1BA | BA | 113.1 | 662 | 48 | 21 | 15 |
| 1BB | BB | 112.9 | 710 | 70 | 15 | F |
| 1BC | BC | 112.6 | 780 | 74 | 14 | E |
| 1BD | BD | 112.4 | 854 | 88 | 12 | C |
| 1BE | BE | 112.1 | 942 | 108 | 9 | 9 |
| 1BF | BF | 111.9 | 1050 | 130 | 8 | 8 |
| 1C0 | C0 | 111.6 | 1180 | 160 | 6 | 6 |
| 1C1 | C1 | 111.4 | 1340 | 210 | 5 | 5 |
| 1C2 | C2 | 111.1 | 1550 | 280 | 4 | 4 |
| 1C3 | C3 | 110.9 | 1830 | 360 | 3 | 3 |
| 1C4 | C4 | 110.6 | 2190 | 490 | 2 | 2 |
| 1C5 | C5 | 110.4 | 2680 | 640 | 2 | 2 |
| 1C6 | C6 | 110.1 | 3320 | 680 | 2 | 2 |
| 1C7 | C7 | 109.9 | 4000 | 900 | 1 | 1 |
| 1C8 | C8 | 109.6 | 4900 | 910 | 1 | 1 |
| 1C9 | C9 | 109.4 | 5810 | 700 | 1 | 1 |
| 1CA | CA | 109.2 | 6510 | 640 | 2 | 2 |
| 1CB | CB | 108.9 | 7150 | 100 | 10 | A |
| 1CC | CC | 108.7 | 7250 | | | |
| 1CD | CD | 108.5 | 4100 | | | |
| 1CE | CE | 108.2 | 2600 | | | |
| 1CF | CF | 108.0 | 2010 | | | |
| 1D0 | D0 | 107.8 | 1660 | | | |
| 1D1 | D1 | 107.5 | 1430 | | | |
| 1D2 | D2 | 107.3 | 1230 | | | |
| 1D3 | D3 | 107.1 | 1110 | | | |
| 1D4 | D4 | 106.8 | 1000 | | | |
| 1D5 | D5 | 106.6 | 910 | | | |
| 1D6 | D6 | 106.4 | 835 | | | |
| 1D7 | D7 | 106.2 | 770 | | | |
| 1D8 | D8 | 105.9 | 718 | | | |
| 1D9 | D9 | 105.7 | 678 | | | |
| 1DA | DA | 105.5 | 628 | | | |
| 1DB | DB | 105.3 | 582 | | | |
| 1DC | DC | 105.0 | 550 | | | |

FIG. 16

CALCULATION EXAMPLE OF CONTROL-STEP-VALUE FOR PIEZOELECTRIC TRANSFORMER 204

| DIVISION RATIO, 9 MOST SIGNIFICANT BITS | ADDRESS (8-bit) | DRIVE FREQUENCY (Hz) | OUTPUT VOLTAGE (V) | AMOUNT OF CHANGE IN OUTPUT VOLTAGE (DIFFERENCE FROM NEXT ROW) | VALUE FOR 1-V CHANGE (19-bit) | HEX DISPLAY |
|---|---|---|---|---|---|---|
| 115 | 15 | 180.5 | 220 | 10 | 102 | 66 |
| 116 | 16 | 179.9 | 230 | 20 | 51 | 33 |
| 117 | 17 | 179.2 | 250 | 20 | 51 | 33 |
| 118 | 18 | 178.6 | 270 | 20 | 51 | 33 |
| 119 | 19 | 177.9 | 290 | 20 | 51 | 33 |
| 11A | 1A | 177.3 | 310 | 20 | 51 | 33 |
| 11B | 1B | 176.7 | 330 | 20 | 51 | 33 |
| 11C | 1C | 176.1 | 350 | 25 | 41 | 29 |
| 11D | 1D | 175.4 | 375 | 25 | 41 | 29 |
| 11E | 1E | 174.8 | 400 | 35 | 29 | 1D |
| 11F | 1F | 174.2 | 435 | 45 | 23 | 17 |
| 120 | 20 | 173.6 | 480 | 48 | 21 | 15 |
| 121 | 21 | 173.0 | 528 | 71 | 14 | E |
| 122 | 22 | 172.4 | 599 | 71 | 14 | E |
| 123 | 23 | 171.8 | 670 | 90 | 11 | B |
| 124 | 24 | 171.2 | 760 | 100 | 10 | A |
| 125 | 25 | 170.6 | 860 | 140 | 7 | 7 |
| 126 | 26 | 170.1 | 1000 | 180 | 6 | 6 |
| 127 | 27 | 169.5 | 1180 | 200 | 5 | 5 |
| 128 | 28 | 168.9 | 1380 | 270 | 4 | 4 |
| 129 | 29 | 168.4 | 1650 | 360 | 3 | 3 |
| 12A | 2A | 167.8 | 2010 | 450 | 2 | 2 |
| 12B | 2B | 167.2 | 2460 | 560 | 2 | 2 |
| 12C | 2C | 166.7 | 3020 | 610 | 2 | 2 |
| 12D | 2D | 166.1 | 3630 | 630 | 2 | 2 |
| 12E | 2E | 165.6 | 4260 | 610 | 2 | 2 |
| 12F | 2F | 165.0 | 4870 | 590 | 2 | 2 |
| 130 | 30 | 164.5 | 5460 | 520 | 2 | 2 |
| 131 | 31 | 163.9 | 5980 | 420 | 2 | 2 |
| 132 | 32 | 163.4 | 6400 | 300 | 3 | 3 |
| 133 | 33 | 162.9 | 6700 | | | |
| 134 | 34 | 162.3 | 2300 | | | |
| 135 | 35 | 161.8 | 1650 | | | |
| 136 | 36 | 161.3 | 1380 | | | |
| 137 | 37 | 160.8 | 1210 | | | |
| 138 | 38 | 160.3 | 1120 | | | |
| 139 | 39 | 159.7 | 1010 | | | |
| 13A | 3A | 159.2 | 918 | | | |
| 13B | 3B | 158.7 | 849 | | | |
| 13C | 3C | 158.2 | 788 | | | |
| 13D | 3D | 157.7 | 731 | | | |
| 13E | 3E | 157.2 | 683 | | | |
| 13F | 3F | 156.7 | 640 | | | |
| 140 | 40 | 156.3 | 598 | | | |
| 141 | 41 | 155.8 | 563 | | | |
| 142 | 42 | 155.3 | 534 | | | |
| 143 | 43 | 154.8 | 501 | | | |

POWER SUPPLY APPARATUS AND IMAGE FORMATION APPARATUS

CROSS REFERENCE TO RELATED APPLICATIONS

This application claims priority based on 35 USC 119 from prior Japanese Patent. Application No. 2011-135240 filed on Jun. 17, 2011, entitled "POWER SUPPLY APPARATUS AND IMAGE FORMATION APPARATUS", the entire contents of which are incorporated herein by reference.

BACKGROUND OF THE INVENTION

1. Field of the Invention

The present disclosure relates to a power supply apparatus configured to control output by using a piezoelectric transformer, and also relates to an image formation apparatus equipped with the power supply apparatus.

2. Description of Related art

For instance, a conventional power supply apparatus of the above-mentioned kind switches the control gain in accordance with the output voltage by controlling a piezoelectric transformer by means of a voltage-controlled oscillator (VCO) (see, for example, Japanese Patent Application Publication No. 2007-189880, especially paragraphs [0021] to [0026], and FIG. 1).

SUMMARY OF THE INVENTION

The piezoelectric transformer is always controlled in the same manner with voltages around the target output voltage irrespective of the frequency of the signal to drive the piezoelectric transformer. In other words, the control is the same for both a high output voltage near the resonant frequency and a low output, voltage. Note that even a single piezoelectric transformer varies an amount of output-voltage change per unit of frequency change depending on a frequency range as shown in FIGS. 2 and 6 of the above-mentioned document (Japanese Patent Application Publication No. 2007-189880). Accordingly, it is difficult to achieve high controllability both under a high output voltage and under a low output voltage.

An aspect of the invention is a power supply apparatus. The power supply apparatus includes: a switching circuit configured to receive a drive signal and to output a switching signal on the basis of the drive signal; a piezoelectric transformer configured to receive the switching signal and to change an output value in accordance with a frequency of the drive signal; an output converter configured to detect the output value and to output a feedback signal proportional to an output level; a drive-signal generator configured to receive an N-bit division ratio, to divide a reference clock based on the received N-bit division ratio, and to output the drive signal with an average cycle proportional to the N-bit division ratio; a comparator configured to compare a target data value of a predetermined bit width with a feedback data value of the predetermined bit width obtained by an analog-to-digital conversion of the feedback signal, and to output a comparative output in accordance with a result of the comparison; a data memory configured to hold preset data in each address; and an arithmetic unit configured to update successively the N-bit division ratio at every step whose processing timing is managed by a timer, by adding or subtracting the preset data read from the data memory to or from the N-bit division ratio in accordance with the comparative output. The arithmetic unit is configured to perform an arithmetic operation to make the feedback data value approach the target data value by a negative feedback control, the arithmetic operation using, as the preset data, data read from an address specified, by data with a predetermined bit width of M (M<N) extracted from the successively updated N-bit division ratio.

According to this aspect, the amount of the output value (for example, output voltage or output current) change can be made substantially constant across the steps of the negative feedback control. Accordingly, a stable control can always be performed by controlling the value within a certain variable range. In addition, even if the output value changes (either increases or decreases) around a target value, the amount of change in the output value can be limited within a desired narrow range.

BRIEF DESCRIPTION OF THE DRAWINGS

FIG. 7 is a table showing pieces of 9-bit data (output values) held in a memory and their respective 8-bit addresses (input values).

FIG. 8 is a table showing pieces of 9-bit data (output values) held in the memory and their respective 8-bit addresses (input values).

FIG. 9 is a table showing data on the relationships between values of a 19-bit division ratio held in a 19-bit register and respective output voltages outputted by the image-transfer-bias generator for cyan (C) color.

FIG. 10 is a table showing data on the relationships between values of a 19-bit division ratio held in a 19-bit register and respective output voltages outputted by each of the image-transfer-bias generators for magenta (M), yellow (Y), and black (K) colors.

FIG. 13 is a time chart illustrating selection pulse signals outputted by a timer.

FIG. 14 is a table showing examples of calculations to obtain values for a control-step-value table in a case where a piezoelectric transformer for cyan (C) color is used in the image-transfer-bias generator.

FIG. 15 is a table showing examples of calculations to obtain values for a control-step-value table in a case where a piezoelectric transformer for cyan (C) color is used in the image-transfer-bias generator.

FIG. 16 is a table showing examples of calculations to obtain values for a control-step-value table in a case where a piezoelectric transformer for magenta (M), yellow (Y), or black (K) color is used in the image-transfer-bias generator.

DETAILED DESCRIPTION OF EMBODIMENTS

Figure 1:
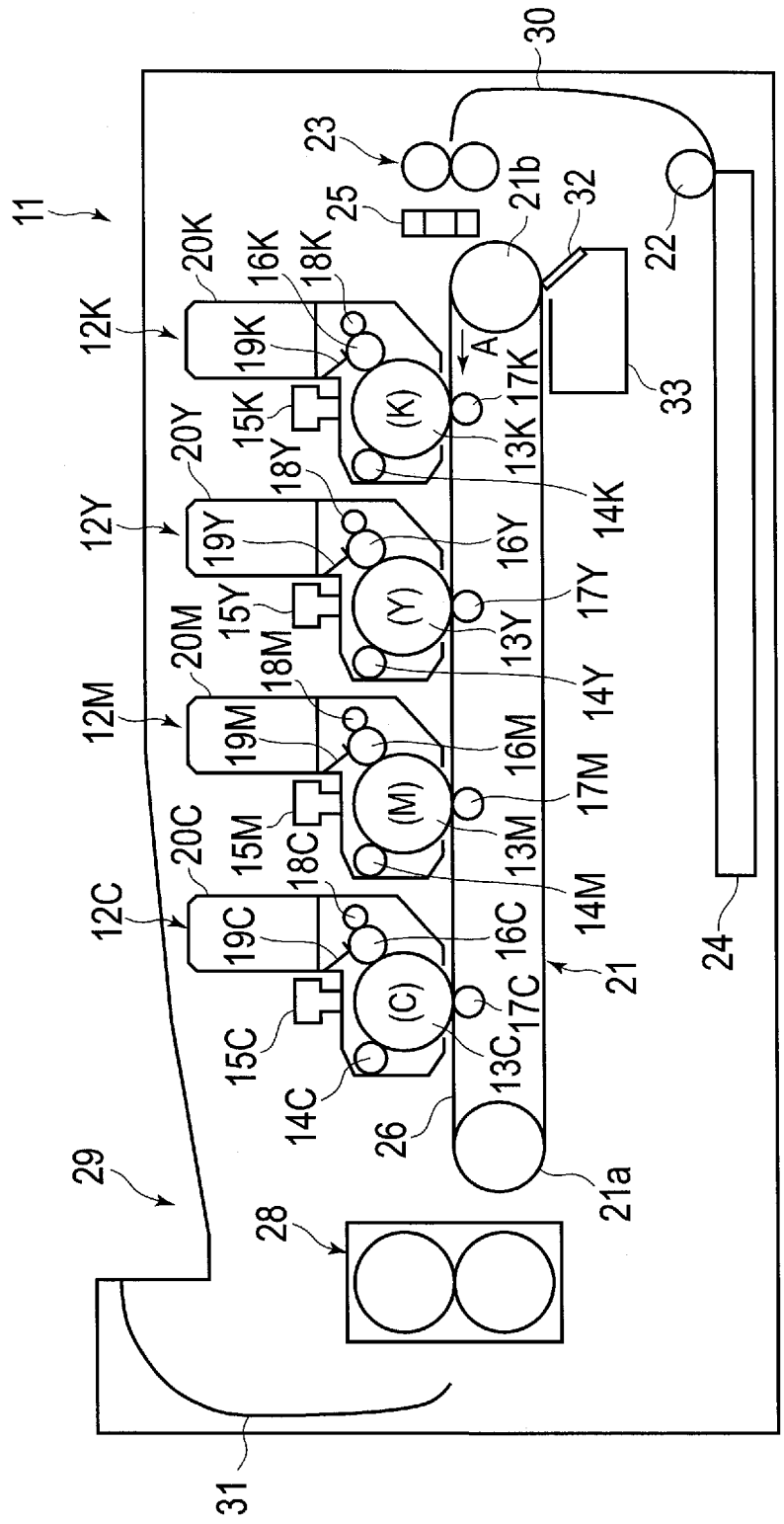
FIG. 1 is a principal-portion configuration diagram illustrating schematically the configuration of a principal portion according to a first embodiment of an image formation apparatus equipped with a power supply apparatus according to the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

FIG. 1 is a principal-portion configuration diagram illustrating schematically the configuration of a principal portion according to a first embodiment of an image formation apparatus equipped with a power supply apparatus according to the invention.

Image formation apparatus 11 is, for example, an electrophotographic color printer including four image formation units 12K, 12Y, 12M, and 12C (image formation devices) that function independently of one another (and may be simply referred to as "image formation unit(s) 12" when no particular unit needs to be specified). Image formation units 12K, 12Y, 12M, and 12C are arranged along a direction in which print sheet 30 as a print medium is inserted into image formation apparatus 11 and then discharged from image formation apparatus 11. Image formation unit 12K forms an image of black (K) color. Image formation unit 12Y forms an image of yellow (Y) color. Image formation unit 12M forms an image of magenta (M) color. Image formation unit 12C forms an image of cyan (C) color. Print sheet 30 used as a print medium may be replaced with an OHP sheet, an envelope, a sheet of copying paper, a sheet of specialized paper, or the like.

Image formation units 12K, 12Y, 12M, and 12C respectively include photosensitive drums 13K, 13Y, 13M, and 13C (which may be simply referred to as "photosensitive drum(s) 13" when no particular drum needs to be specified), and also includes charger rollers 14K, 14Y, 14M, and 14C, respectively (which may be simply referred to as "charger roller(s) 14" when no particular roller needs to be specified). Charger rollers 14 electrically charge the surfaces of respective photosensitive drums 13K, 13Y, 13M, and 13C entirely and uniformly. Image formation units 12K, 12Y, 12M, and 12C respectively include development rollers 16K, 16Y, 16M, and 16C (which may be simply referred to as "development roller(s) 16" when no particular roller needs to be specified), which form their respective, visible toner images of colors by applying developers (e.g., toners) (not illustrated) to electrostatic latent images formed on the surfaces of photosensitive drums 13K, 13Y, 13M, and 13C, respectively. Image formation units 12K, 12Y, 12M, and 12C respectively include toner supply rollers 18K, 18Y, 18M, and 18C (which may be simply referred to as "toner supply roller(s) 18" when no particular roller needs to be specified), which are pressed against respective development rollers 16K, 16Y, 16M, and 16C.

Toner supply rollers 18K, 18Y, 18M, and 18C supply toners of their respective colors to respective development rollers 16K, 16Y, 16M, and 16C. The color toners are supplied to toner supply rollers 18K, 18Y, 18M, and 18C from respective toner cartridges 20K, 20Y, 20M, and 20C, which are removably set respectively in the main bodies of image formation units 12K, 12Y, 12M, and 12C (which may be simply referred to as "toner cartridge (s) 20" when no particular cartridge needs to be specified). Development blades 19K, 19Y, 19M, and 19C are pressed respectively against development rollers 16K, 16Y, 16M, and 16C (which may be simply referred to as "development blade(s) 19" when no particular blade needs to be specified). Development blade 19 spreads the toner supplied from toner supply roller 18 to the surface of development roller 16 until the toner forms a thin layer on the surface. Note that in the description given above, toner cartridge 20 is removably set in the main body of image formation unit 12. It is, however, possible that toner cartridge 20 be formed integrally with the main body of image formation unit 12.

Image formation units 12K, 12Y, 12M, and 12C include LED heads 15K, 15Y, 15M, and 15C, respectively (which may be simply referred to as "LED head (s) 15" when no particular head needs to be specified), which are provided at positions above respective photosensitive drums 13K, 13Y, 13M, and 13C in such a manner as to face respective photosensitive drums 13K, 13Y, 13M, and 13C. LED head 15 casts light onto photosensitive drum 13 in accordance with image data of the corresponding color, and thereby forms an electrostatic latent image for that image data.

Image-transfer unit 21 is provided, at a position below photosensitive drums 13 of four image formation units 12. Image-transfer unit 21 includes image-transfer rollers 17K, 17Y, 17M, and 17C (which may be simply referred to as "image-transfer roller (s) 17" when no particular roller needs to be specified), and image-transfer belt 26, which is looped around image-transfer-belt drive roller 21a and image-transfer-belt driven roller 21b, and is capable of rotating in the direction indicated by arrow A in FIG. 1. Each image-transfer roller 17 is pressed against corresponding photosensitive drum 13 with image-transfer belt 26 located in-between. Each image-transfer roller 17 electrically charges the sheet in the nip portion so that the sheet, can have the opposite polarity to the toner. Thus, the toner images of the four colors formed on the surfaces of photosensitive drums 13 are transferred one after another onto the sheet in a manner such that the color toner images are laid one upon another.

A sheet-feeder system to supply sheets to image-transfer belt 26 is provided in a lower portion of image formation apparatus 11. The sheet-feeder system includes, among other things, hopper roller 22, a pair of register rollers 23, and sheet-holder cassette 24.

In addition, an image-fixation unit 28 is provided at the sheet-discharge side of image-transfer belt 26. Image-fixation unit 28 includes a heater roller and a backup roller and applies pressure and heat to the toner transferred on the sheet, thereby fixing the toner to the sheet. Unillustrated sheet-discharge rollers arranged along sheet guide 31, and sheet-stacker 29, and the like are provided at the sheet-discharge side of image-fixation unit 28.

Now, a brief description is given below of the printing actions performed by image formation apparatus 11 with the above-described configuration. Firstly, one of print sheets 30 held in sheet-holder cassette 24 is picked up by hopper roller 22, and sent to register rollers 23, which correct the orientation of print sheet 30 if print sheet 30 is transported obliquely. Then, print sheet 30 is sent from register rollers 23 to image-transfer belt 26 and is transported sequentially to image formation units 12K, 12Y, 12M, and 12C along with the rotation of image transfer belt 26. Sheet-detection sensor 25 is provided at the downstream side of register rollers 23. Sheet-detection sensor 25 detects the passing of print sheet 30 using a method to detect contact of print sheet 30, and then outputs a detection signal to printer-engine controller 153 (see FIG. 2), which is to be described in detail later.

In the meanwhile, the surface of photosensitive drum 13 in each image formation unit 12 is electrically charged by charger roller 14, and then is exposed to light emitted by LED head 15. As a result of this exposure to light, an electrostatic latent image is formed on the surface of the photosensitive drum. Then, the electrostatic latent image is converted to a toner image of the corresponding color. To this end, the toner that has been spread into a thin layer on the surface of development roller 16 is made to electrostatically adhere to the portions where the electrostatic latent image is formed. The toner images formed in this way on the surfaces of respective photosensitive drums 13 are then transferred, one after another onto a surface of print sheet 30 by respective image-transfer rollers 17. The transferred toner images are laid one upon another on the surface of print sheet 30, and thereby a unified color toner image is formed on the surface of print sheet 30. The toner that remains on the surface of each photosensitive drum 13 even after the transfer of the toner image is removed by an unillustrated cleaner device.

Print sheet 30 with the unified color toner image is sent to image-fixation unit 28. In image-fixation unit 28, the unified color toner image is fixed to print sheet 30, and thereby a unified color image is formed on the surface of print sheet 30. Print sheet 30 with the unified color image is transported along sheet guide 31 by unillustrated sheet-discharge rollers, and is then discharged to sheet-stacker 29. Through the series of processes described above, a unified color image is formed on a surface of print sheet 30. The remaining toners adhering to image-transfer belt 26 are collected into belt-cleaner container 33 by belt-cleaner blade 32.

Figure 2:
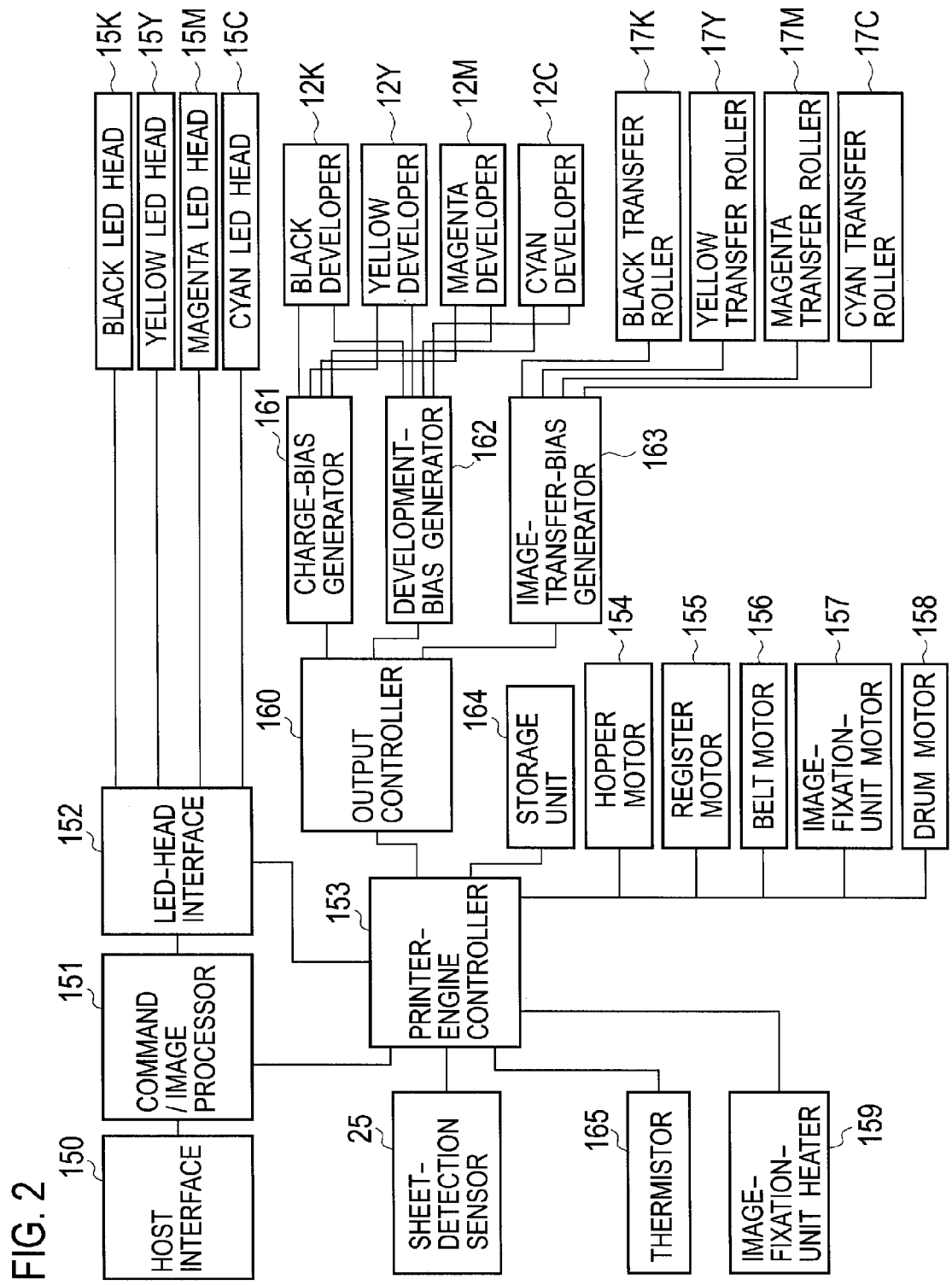
FIG. 2 is a block diagram illustrating the circuit configuration of a control system in the image formation apparatus.

FIG. 2 is a block diagram illustrating the circuit configuration of a control system in image formation apparatus 11.

Host interface 150 exchanges data with command/image processor 151, which outputs image data to LSD-head interface 152. LED-head interface 152 makes LED heads 15K, 15Y, 15M, and 15C emit light. Printer-engine controller 153 controls the head-drive pulses and the like used for LED-head interface 152 to make LED heads 15K, 15Y, 15M, and 15C emit light.

Printer-engine controller 153 sends values to control the charge bias, the development bias, the image-transfer bias, and the like to output controller 160. Output controller 160 sends control signals to charge-bias generator 161, development-bias generator 162, and image-transfer-bias generator 163, which includes a piezoelectric transformer as described later in detail. Charge-bias generator 161 individually applies bias voltages to charger rollers 14 (see FIG. 1) of image formation units 12 of black (K), yellow (Y), magenta (M), and cyan (C) colors. Development-bias generator 162 individually applies bias voltages to development rollers 16 (see FIG. 1) of image formation units 12 of black (K), yellow (Y), magenta (M), and cyan (C) colors.

Sheet-detection sensor 25 is used to adjust the timing when the bias voltage is generated by image-transfer-bias generator 163 as described later in detail. Printer-engine controller 153 drives, at predetermined timings, hopper motor 154 to drive hopper roller 22, register motor 155 to drive the pair of register rollers 23, belt motor 156 to drive image-transfer-belt drive roller 21a, image-fixation-unit motor 157 to drive those rollers that are provided in image-fixation unit 28, and four drum motors 158 for black (K), yellow (Y), magenta (M), and cyan (C) colors to drive respectively various rotary members, such as photosensitive drums 13K, 13Y, 13M, and 13C in respective image formation units 12K, 12Y, 12M, and 12C. The heater roller provided in image-fixation unit 28 is equipped with image-fixation-unit heater 159. Thermistor 165 is provided to detect the temperature of the heater roller. The temperature of image-fixation-unit heater 159 is controlled by printer-engine controller 153 in accordance with the temperature detected by thermistor 165.

Figure 3:
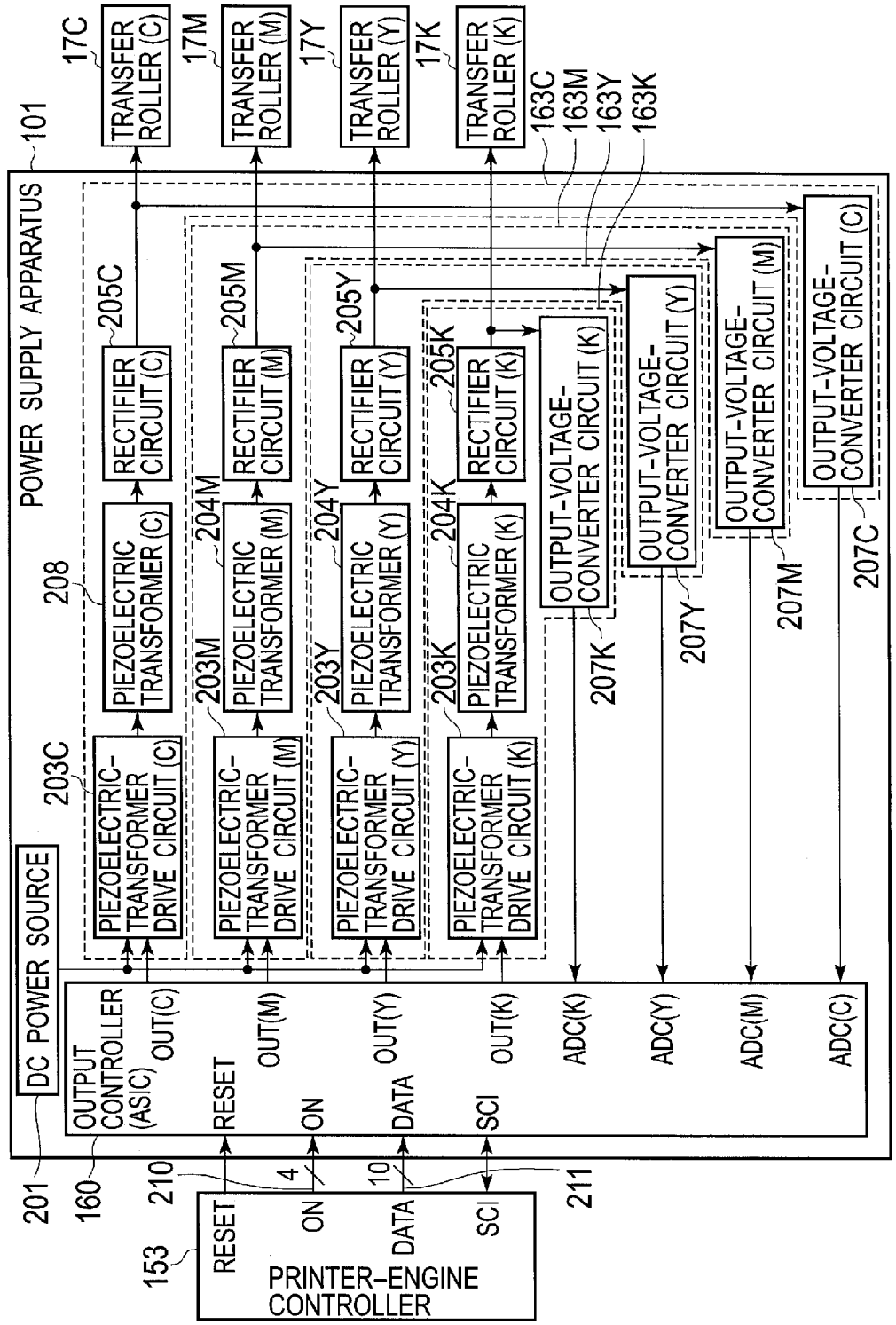
FIG. 3 is a block diagram illustrating the power supply apparatus of the first embodiment.

FIG. 3 is a block diagram illustrating power supply apparatus 101 of the first embodiment. The block diagram of FIG. 3 shows some of the functional blocks shown in the block diagram of FIG. 2. Of all the functional blocks shown in FIG. 2, those functional blocks that are also shown in FIG. 3 are those that are needed to apply a bias voltage to image-transfer roller 17. For example, of all the circuits that are provided in printer-engine controller 153 and in output controller 160, those circuits that are used to generate the charge bias and development bias are not shown in FIG. 3.

Output controller 160 shown in FIG. 3 is formed as an application specific integrated circuit (ASIC). Output controller 160 receives from printer-engine controller 153: a reset signal; ON signals (4 bit) 210 to instruct the application timing; target-value data (10 bit) 211 to instruct the voltage applied to each image-transfer roller 17 as the output load; and a bidirectional serial communication signal SCI. Output controller 160 outputs pulses to drive the piezoelectric transformers, through output portions. In order to individually control four image-transfer rollers 17 for cyan (C), magenta (M), yellow (Y), and black (K) colors, four output ports OUT (C), OUT(M), OUT(Y), and OUT(K) (which may be simply referred to as "output port (s) OUT" when no particular port needs to be specified), are provided to individually output piezoelectric-transformer drive pulses to respective piezoelectric-transformer drive circuits 203C, 203M, 203Y, and 203K (which may be simply referred to as "piezoelectric-transformer drive circuit(s) 203" when no particular circuit needs to be specified), which serve as switching circuits.

A total of four signal paths are provided for ON signals 210 (one signal path for each of the cyan-color (C-color), magenta-color (M-color), yellow-color (Y-color), and black-color (K-color) print systems). A total of 40 signal paths are provided for target-value data 211 (10 signal paths for each of the color print systems).

Piezoelectric transformer 208 and piezoelectric transformers 204M, 204Y, and 204K (which may be simply referred to as "piezoelectric transformer(s) 204" when no particular transformer needs to be specified) are piezoelectric transformers configured to raise voltages by using the resonance of piezoelectric vibrators such as ceramics. As described later, piezoelectric transformer 208 has different specs from those of each piezoelectric transformer 204. DC power source 201 is shared by four piezoelectric-transformer drive circuits 203 and outputs a constant DC voltage of 24V as described later. Piezoelectric-transformer drive circuits 203 using switching elements output primary-side voltages that are applied to the primary sides of respective piezoelectric transformers 208 and 204.

Rectifier circuits 205C, 205M, 205Y, and 205K (which may be simply referred to as "rectifier circuit(s) 205" when no particular circuit needs to be specified) rectify secondary-side high voltages outputted from the secondary sides of corresponding piezoelectric transformers 204 and 208, and thereby convert the secondary-side high voltages to DC voltages. Rectifier circuits 205 apply the DC voltages as image-transfer bias voltages to image-transfer rollers 17 serving as output loads. Output-voltage-converter circuits 207C, 207M, 207Y, and 207K (which may be simply referred to as "output-voltage-converter circuit(s) 207" when no particular circuit needs to be specified), serving as output converters, convert high-output, image-transfer bias voltages (DC) of respective rectifier circuits 205C, 205M, 205Y, and 205K to low voltages by lowering the voltages at predetermined proportions, and apply the low voltages as output-voltage information (feedback voltage signals) respectively to input ports ADC (C), ADC(M), ADC(Y), and ADC(K) (which may be simply referred to as "input port (s) ADC" when no particular input port needs to be specified) of four analog/digital converters (ADC) of output controller 160.

As shown in FIG. 3, piezoelectric-transformer drive circuit 203C, piezoelectric transformer 208, rectifier circuit 205C, and output-voltage-converter circuit 207C together form image-transfer-bias generator 163C. Piezoelectric-transformer drive circuit 203M, piezoelectric transformer 204M, rectifier circuit 205M, and output-voltage-converter circuit 207M together form image-transfer-bias generator 163M. Piezoelectric-transformer drive circuit 203Y, piezoelectric transformer 204Y, rectifier circuit 205Y, and output-voltage-converter circuit 207Y together form image-transfer-bias generator 163Y. Piezoelectric-transformer drive circuit 203K, piezoelectric transformer 204K, rectifier circuit 205K, and output-voltage-converter circuit 207K together form image-transfer-bias generator 163K.

Note that image formation apparatus 11 of this embodiment is a tandem-type, direct-transfer-type image formation apparatus including image-transfer portions arranged in line as shown in FIG. 1. In an image formation apparatus of the above-mentioned kind, a further downstream-side image-transfer portion needs a higher image-transfer bias. Hence, provided that image formation units for black (K), yellow (Y), magenta (M), and cyan (C) colors are arranged in this order from the upstream side, a higher voltage has to be applied to image-transfer roller 17C for cyan (C) color than any of the voltages to be applied to the other image-transfer rollers 17M, 17Y, and 17K. To this end, piezoelectric transformer 208 for cyan (C) color is provided with a piezoelectric transformer that has a length of 32 mm whereas each of the other three piezoelectric transformers 204 is provided with a piezoelectric transformer that has a length of 21 mm.

Note that output controller 160 of this embodiment is independently formed as an ASIC but may be formed in the LSI of printer-engine controller 153. In addition, a term "ASIC" is used in this specification, but output controller 160 may be formed as a member with a built-in CPU such as a microprocessor, or as a field programmable gate array (FPGA), or the like.

Image-transfer-bias generator 163C shown in FIG. 3 has a basically identical circuit configuration to the circuit configuration of each of image-transfer-bias generators 163M, 163Y, and 163K also shown in FIG. 3, except that there are differences in the specs of piezoelectric transformers and the capacities of some capacitors between image-transfer-bias generator 163C and each of image-transfer-bias generators 163M, 163Y, and 163K. The configurations of image-transfer-bias generators 163M and 163C are described below by referring to FIGS. 4 and 5. in which the circuit configurations of only image-transfer-bias generators 163M and 163C are shown, respectively, together with printer-engine controller 153 and output controller 160.

Figure 4:
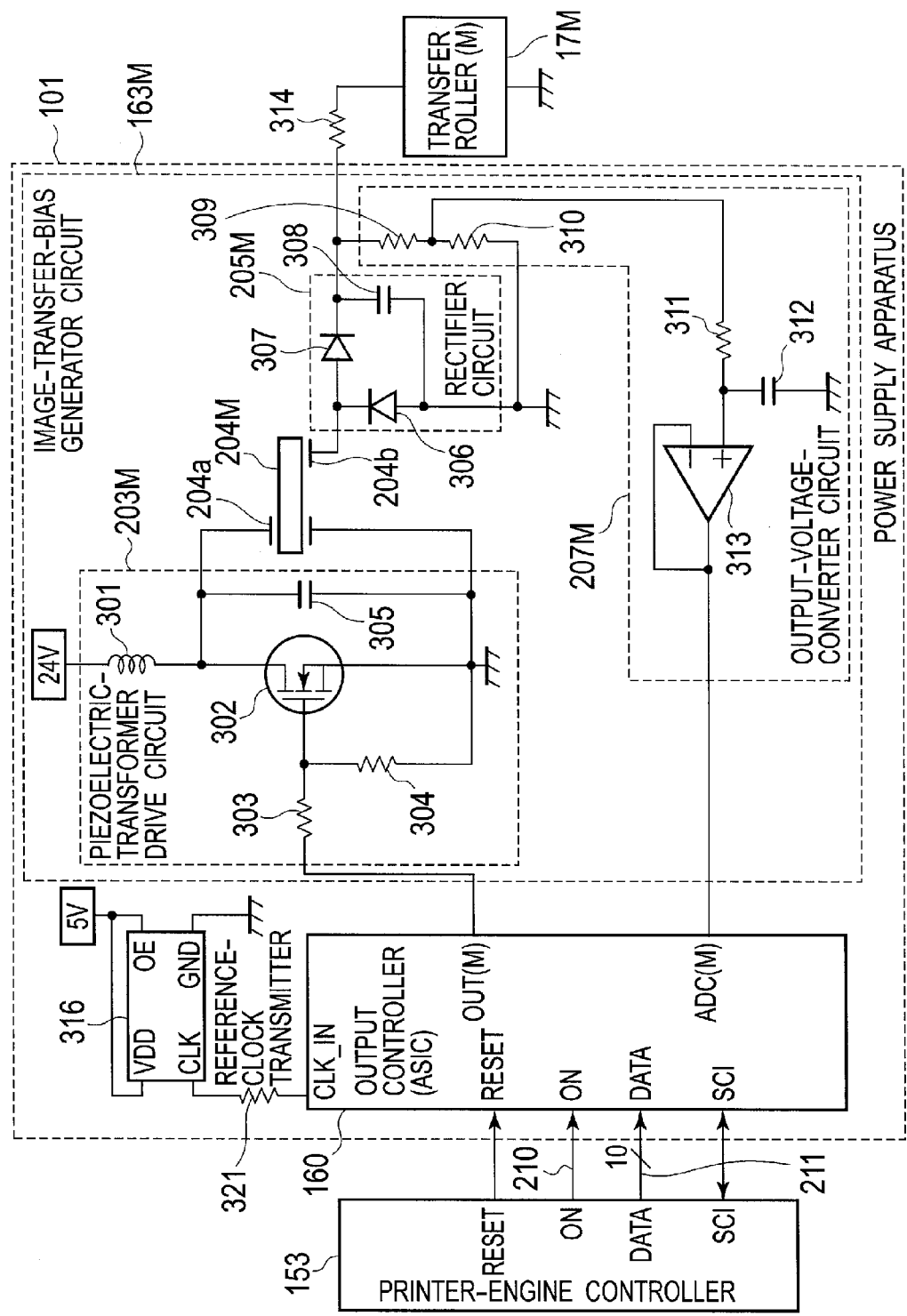
FIG. 4 is a circuit configuration diagram illustrating the circuit configuration of only an image-transfer-bias generator for magenta (M) color together with both a printer-engine controller and an output controller according to the first embodiment.

If a constituent element that appears in FIG. 3 appears also in FIG. 4, the constituent element in FIG. 4 is denoted by the same reference numeral that is used in FIG. 3. The elements that are shown in FIG. 4 are: printer-engine controller 153; output controller 160; image-transfer-bias generator 163M for magenta (M) color; piezoelectric-transformer drive circuit 203M for magenta (M) color; piezoelectric transformer 204M for magenta (M) color; rectifier circuit 205M for magenta (M) color; output-voltage-converter circuit 207M for magenta (M) color; and image-transfer roller 17M for magenta (M) color serving as an output load. Reference-clock transmitter 316 has power input portion VDD, output enable terminal OE, ground terminal GND, and clock terminal CLK. A voltage of 5V is supplied or applied to both power input portion VDD and output enable terminal OE by an unillustrated DC-voltage source. Ground terminal GND is connected to ground. Clock terminal CLK is connected, via resistor 321, to clock-input terminal CLK_IN of output controller 160 formed as an ASIC. Reference-clock transmitter 316 thus supplies a clock signal of 50 MHz to output controller 160.

Output controller 160 works in synchronization with the clock signal thus inputted and receives a reset signal, ON signal (4 bit) 210, target-value data (10 bit) 211, and a bidirectional serial communication signal SCI from printer-engine controller 153, and outputs a pulse through the output portion OUT (M). ON signal (4 bit) 210 individually instructs the timing at which the image-transfer bias is applied to each of image-transfer rollers 17. Target-value data (10 bit) 211 instructs the voltage to be applied to each of image-transfer rollers 17 serving as output loads. A total of four signal paths are provided for ON signals 210 (one signal path for each of the cyan-color (C-color), magenta-color (M-color), yellow-color (Y-color), and black-color (K-color) print systems). A total of 40 signal paths are provided for target-value data 211 (10 signal paths for each of the color print systems). FIG. 4 shows only the signal paths for the signals to be inputted to the magenta-color (M-color) print system and the signal paths for the signals to be outputted from the magenta-color (M-color) print system through output port OUT (M).

Note that, in a case where one of the cyan-color (C-color), magenta-color (M-color), yellow-color (Y-color), and black-color (K-color) print systems needs to be specified in the description, such terms as "for the C-color print system" and the like are also used as described above.

Piezoelectric-transformer drive circuit 203 includes resistors 303 and 304, N-channel power MOSFET (hereinafter, referred, to as "FET") 302, capacitor 305, and inductor 301. The gate of FET 302 is connected, via resistor 303, to output port OUT (M) of output controller 160, and is earthed (grounded) via resistor 304. The drain of FET 302 is connected, via inductor 301, to the source of a DC voltage of 24V, and is also connected to primary-side input terminal 204a of piezoelectric transformer 204M for the M-color print system. The source of FET 302 is earthed, and is also connected to the drain of FET 302 via capacitor 305. If, in the configuration described above, a pulse is inputted to the gate of FET 302, a sinusoidal half wave with a peak of approximately 100V is applied to primary-side input terminal 204*a* of piezoelectric transformer 204M.

In this case, an output from 0V to 7.0 kV approximately is obtained from secondary-side output terminal 204*b* of piezoelectric transformer 204M in accordance with the switching frequency of FET 302. Concerning this secondary-side output characteristic, the boost ratio is determined in accordance with the switching frequency of FET 302 (=frequency of the piezoelectric-transformer drive pulse) as described later.

Rectifier circuit 205M includes diodes 306 and 307, and also includes capacitor 308 and converts an AC high-voltage output outputted from piezoelectric transformer 204M to a DC high-voltage output. This DC high-voltage output becomes the output voltage of image-transfer-bias generator 163M, that is, the voltage to be applied, as the image-transfer bias voltage, to image-transfer roller 17M for the M-color print system serving as the output load. Output-voltage-converter circuit 207M divides this image-transfer bias voltage by using resistor 309 and resistor 310, and then makes the divided voltage smooth by using resistor 311 and capacitor 312. After that, feedback voltage (AC) serving as output-voltage information (feedback voltage signal) is sent from voltage-follower operational amplifier 313 to input port ADC (M) of the ADC of output controller 160.

Note that in this embodiment, the resistance of resistor 309 of output-voltage-converter circuit 207M is 200 MΩ and the resistance of resistor 310 is 100 kΩ. Hence, output-voltage-converter circuit 207M sends, to input port ADC (M), a feedback voltage signal with a reduced voltage that is approximately 2000 times less than the image-transfer bias voltage. Once a feedback voltage signal is inputted into output controller 160, output controller 160 A/D-converts the inputted signal by using 10-bit ADC 414 (see FIG. 6) of 5-V input. Specifically, the 0-V to 10-kV voltage of image-transfer bias (output) voltage is converted to a feedback voltage value of a digital value of 000hex to 3FFhex.

Figure 5:
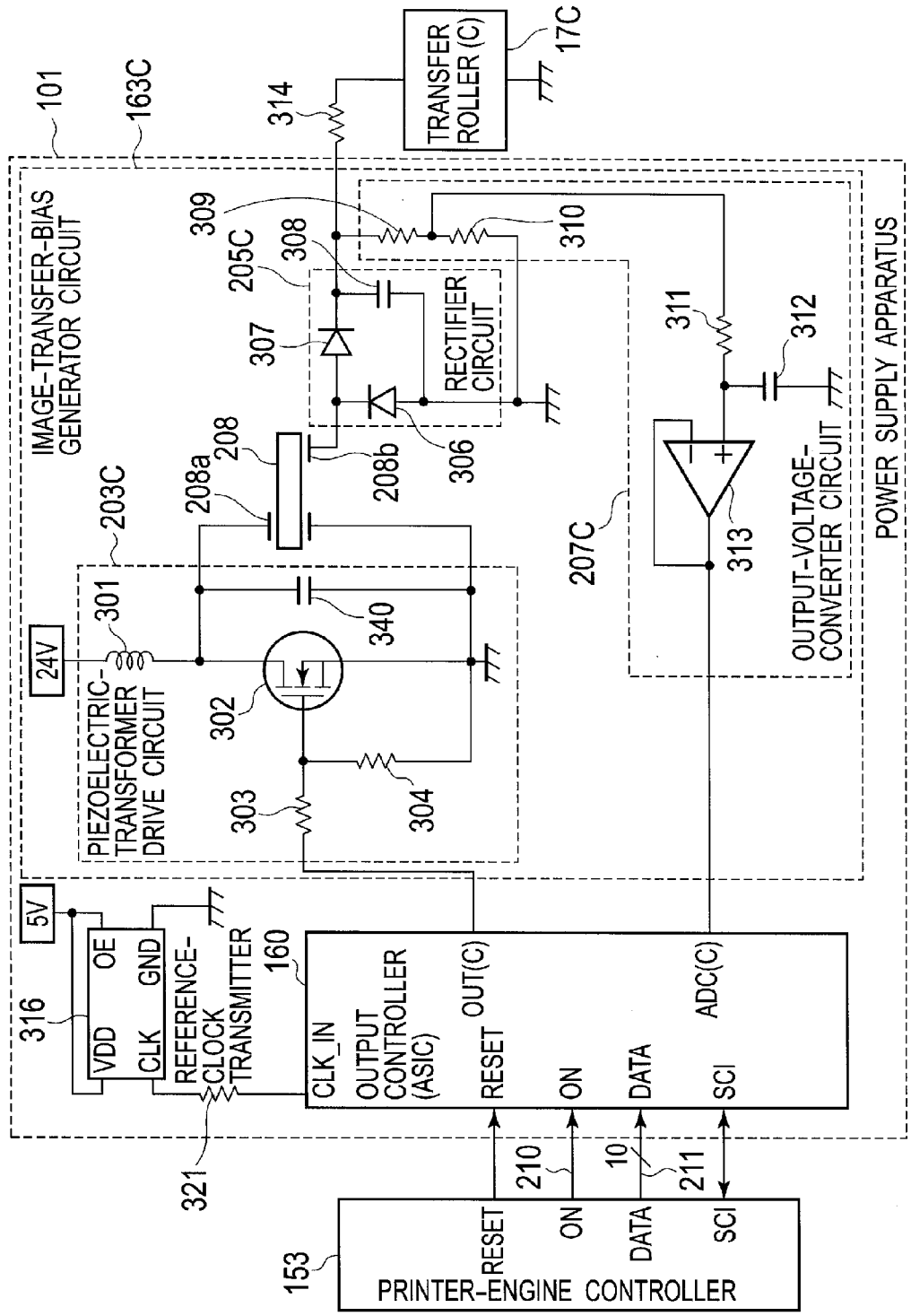
FIG. 5 is a circuit configuration diagram illustrating the circuit configuration of only an image-transfer-bias generator for cyan (C) color together with both the printer-engine controller and the output controller according to the first embodiment.

FIG. 5 is a circuit diagram illustrating the circuit configuration of image-transfer-bias generator 163C for cyan (C) color together with printer-engine controller 153 and output controller 160. As described earlier, the only differences that image-transfer-bias generator 163C has from each image-transfer-bias generator 163 for the M-color, Y-color, or K-color print system are the specs of piezoelectric transformer 208 and the capacitance of capacitor 330. The difference in the capacitance of capacitor 330 is a result of the difference in the specs of piezoelectric transformer 208. In other portions of the configuration, the only difference is that though output controller 160 of FIG. 4 has both output port OUT (M) and input port ADC (M) for the M-color print system, output controller 160 of FIG. 4 has both output port OUT (C) and input port ADC (C) for the C-color print system. There is not any other difference between the two circuit configurations. So, no description of FIG. 5 is given any more.

Figure 6:
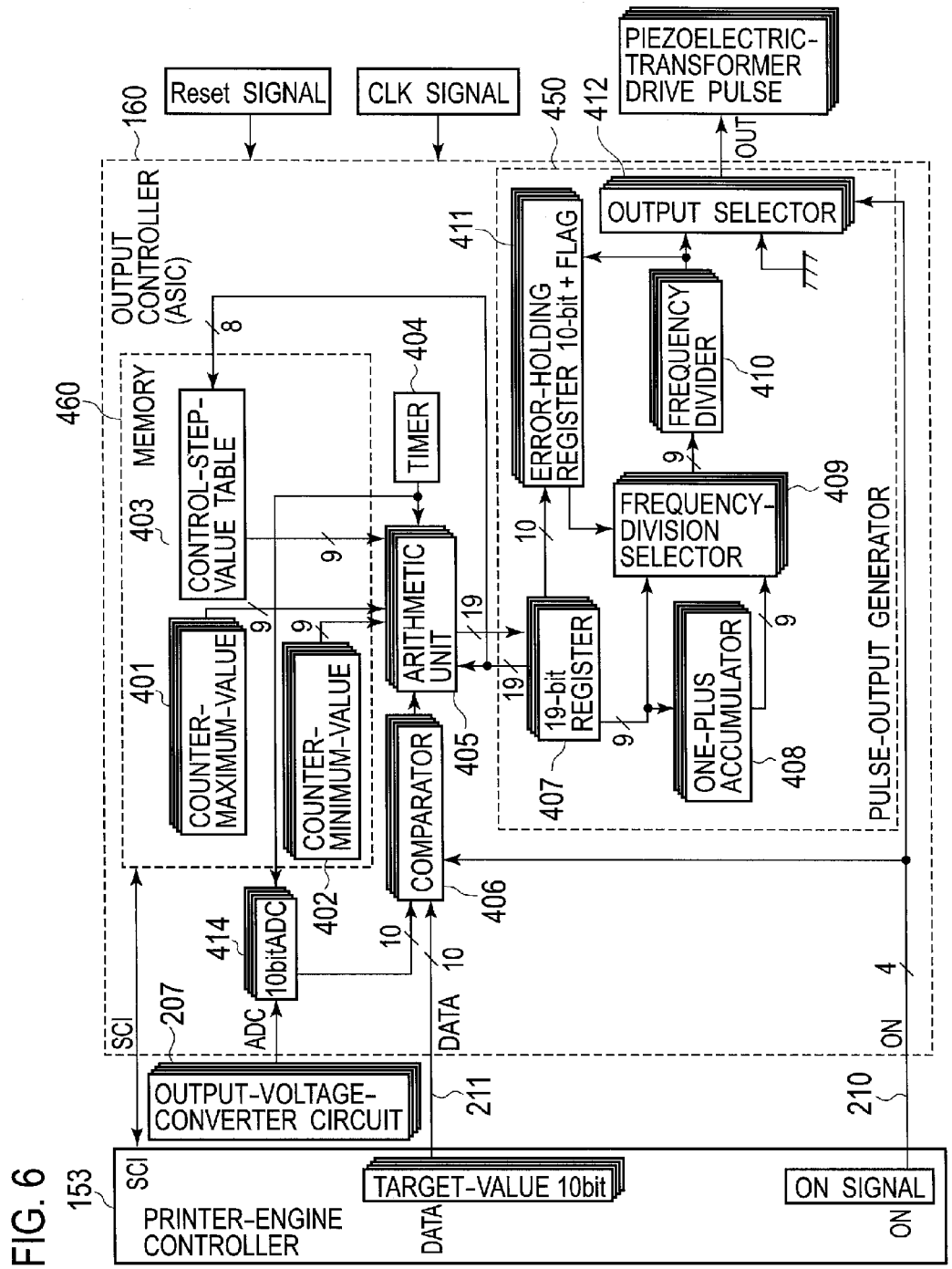
FIG. 6 is a block diagram illustrating functional blocks representing portions included in the output controller formed as an ASIC according to the first embodiment.

FIG. 6 is a block diagram illustrating functional blocks representing portions included in output controller 160 formed as an ASIC shown in FIG. 4. The circuits are described by using a logic description language and the like, and are formed into an ASIC. In FIG. 6, some constituent elements are depicted with fourfold blocks. Each of such elements has four identical members for the K-color, Y-color, M-color, and C-color print systems. Such four identical members act substantially in the same manner. So, for the sake of simple explanation, a fourfold block is used to represent the four identical members of each of such elements, and the description of each of such elements is provided for unspecified members of the element. If necessary, however, description is provided individually for the four members of each of such elements.

If a constituent element that appears in FIG. 3 appears also in FIG. 6, the constituent element in FIG. 6 is denoted by the same reference numeral used in FIG. 3. The elements that are shown in FIG. 6 are: printer-engine controller 153; output controller 160; output-voltage-converter circuit 207; target-value data (10 bit) 211 for the four-color print systems to instruct the voltages to be applied; and ON signal 210. Four feedback voltage signals for the four-color print systems with voltages of 0V to 5V are inputted respectively from output-voltage-converter circuits 207 into corresponding input ports ADC. Four 10-bit ADCs 414 for the four-color print systems convert sequentially the corresponding feedback voltage signals to 10-bit digital values at predetermined timings to be described in more detail later.

Memory 460 serving as a data memory holds pieces of 9-bit data respectively corresponding to 8-bit addresses of 0 to 255. Memory 460 includes control-step-value table 403, four counter-maximum-value tables 401 for the four-color print systems, and four counter-minimum-value tables 402 for the four-color print systems. Four counter-maximum-value tables 401 and four counter-minimum-value tables 402 for the four-color print systems hold the maximum values of and the minimum values of the 9 most significant bits of the corresponding 19-bit operational outputs outputted by four arithmetic units 405 for the four-color print systems as describe later.

FIGS. 7 and 8 are tables showing pieces of 9-bit data (output values) held in memory 460 and their respective 8-bit addresses (input values) in a comparative manner. In the tables shown in FIGS. 7 and 8, addresses from 00hex to F7hex are data held by control-step-value table 403. Addresses from F8hex to FBhex are data held by counter-minimum-value tables 402, and addresses from FChex to FFhex are data held by counter-maximum-value table 401. These pieces of memory data are set, at predetermined timings (which are to be described later) by serial communication signals SCI sent from printer-engine controller 153.

Comparators 406 compare 10-bit target-value data 211 with 10-bit feedback voltage values. Note that 10-bit target-value data 211 instructs target voltages to be applied to image-transfer rollers 17, and that the 10-bit feedback voltage values are digitized values obtained by the analog-to-digital conversion performed by ADC 414. If the feedback voltage value (digital) is equal to or larger than the corresponding target-value data (digital), the corresponding comparator outputs an "L-level" signal to arithmetic unit 405, and otherwise outputs an "H-level" signal to corresponding arithmetic unit 405. Such comparisons are sequentially performed individually for the four-color print systems. In accordance with the output (either an "H-level" or an "L-level") of each comparator 406, corresponding arithmetic unit 405 adds or subtracts 9-bit data (output value), which are read from control-step-value table 403, to or from the corresponding 19-bit digital value held in corresponding 19-bit register 407. Arithmetic unit 405 sends the result of the arithmetic operation back to corresponding 19-bit register 407, and thereby updates 19-bit division ratios held in 19-bit register 407.

Note that the second most significant 8 (M) bits (11SB to 18SB) after the MSB of the 19-bit division ratios are used as the addresses (input values) to designate the reading from control-step-value table 403. Such arithmetic operations are sequentially performed individually for the four-color print systems at predetermined timings (which are to be described later). Note also that, for the sake of a simpler description, the 9 most significant, bits of the 19-bit division ratios represent integer portions of division ratios whereas the 10 least significant bits represent the fractional portions corresponding to "value/1024."

As shown in the time chart of FIG. 13, timer 404 outputs four selection pulse signals each for a particular-color print system. Pulses 180 occur repeatedly in each of the selection pulse signals for the C-color, M-color, Y-color, and K-color print systems, but occur sequentially in the four selection pulse signals. Pulses 180 in one of the selection pulse signals occur at different timings from the timings at which pulses 180 in any other selection pulse signal occur. Timer 404 inputs these selection pulse signals into four arithmetic units 405 for the four-color print systems and four 10-bit ADCs 414. Each of four arithmetic units 405 for the four-color print systems and the corresponding one of four 10-bit ADCs 414 perform a single arithmetic operation at every single step determined by each of the pulse timings. Hence, the addition and subtraction processing performed at each step by any of four arithmetic units 405 for the four-color print systems takes place at a different timing from the timing of similar processing performed by any of the other arithmetic units 405. Accordingly, the data in the single control-step-value table 403 can be shared by four arithmetic units 405 for the four-color print systems.

In accordance with the 19-bit division ratios held in 19-bit registers 407 and updated by arithmetic units 405, pulse-output generators 450, each corresponding to a drive signal generator, generate 30% on-duty piezoelectric-transformer drive pulses with an average cycle of ((19-bit division ratio)× 20÷1024 nsec) as described later. Each pulse-output generator 450 includes 19-bit register 407, one-plus accumulator 408, frequency-division selector 409, error-holding register 411, frequency divider 410, and output selector 412 for the four-color print systems.

As described earlier, the 19-bit division ratios held in 19-bit registers 407 are successively updated by respective arithmetic units 405. In addition, 19-bit registers 407 output the 9 most significant bits of each of the 19-bit division ratios to respective frequency-division selectors 409 and one-plus accumulators 408 and also output the 10 least significant bits of each of the 19-bit division ratios to respective error-holding registers 411. Each error-holding register 411 adds the value of the 10 least significant bits—which is inputted at every rising of the pulses outputted from the corresponding frequency divider 410—to the 10-bit value held in the register, and thereby successively updates this register-held value. Error-holding registers 411 output selection signals to respective frequency-division selectors 409. The selection signal becomes "H" if an overflow occurs at the time when the addition is done. Otherwise, the selection signal becomes "L."

Each frequency-division selector 409 has two input portions. The value of the 9 (S) most significant bits of the 19 (N)-bit division ratio is directly inputted into one of the two input portions. A 9-bit value, obtained by making the corresponding one-plus accumulator 408 add 1 to the value of the 9 most significant bits of the 19-bit division ratio, is inputted into the other one of the two input portions. In addition, a selection signal is inputted into frequency-division selector 409 from corresponding error-holding register 411. When the selection signal is "L," frequency-division selector 409 selects and outputs the directly-inputted 9 most significant bit value of the division ratio to corresponding frequency divider 410. When the selection signal is "H," frequency-division selector 409 selects and outputs the 9-bit value obtained by the addition of 1 by corresponding one-plus accumulator 408 to corresponding frequency divider 410.

Each frequency divider 410 counts the 9-bit value inputted from corresponding frequency-division selector 409, and outputs a 30% on-duty pulse signal with a cycle of (9-bit value× 20 nsec) to corresponding output selector 412. The 20 nsec is a cycle of the CLK signal formed by reference-clock transmitter 316 (see FIG. 4). Each output selector 412 outputs, as the piezoelectric-transformer drive pulse, the pulse signal inputted from frequency divider 410 in response to ON signal 210 of "H" (meaning "ON") inputted from printer-engine controller 153. If, in contrast, ON signal 210 of "L" (meaning "OFF") is inputted from printer-engine controller 153, output selector 412 outputs a 0-V (earth-level) output as described later. Note that the 30% on-duty pulse signal is generated by adding together a quarter (¼) of 9-bit output value, one-thirty-second (1/32) of 9-bit output value, and one-sixty-fourth (1/64) of 9-bit output value, i.e., by adding together values obtained by shifting the 9-bit output of frequency-division selector 409 rightwards by two bits, five bits, and six bits.

Description is given further of the actions of each pulse-output generator 450. As described earlier, one of the two input portions of frequency-division selector 409 receives an input of the 9 most significant bit value of the 19-bit division ratio held in corresponding 19-bit register 407 (note that the 9 most significant bit value corresponds to the integer portion of the 19-bit division ratio). For example, a value "D" is inputted. Then, another value "D+1" is inputted into the other input portion. Frequency-division selector 409 selects and outputs one of the two inputted values of "D" and "D+1" in accordance with the selection signal inputted from corresponding error-holding register 411. The selection is performed periodically with a cycle determined by the pulse signal outputted from corresponding frequency divider 410. If, within a period equivalent to 1024 pulses, a value "D" is outputted E times, and a value "D+1" is outputted (1024−E) times, a control is performed so that {D×E+(D+1)×(1024−E)}/1024 is equal to the 9 most significant bit value+(the 10 least significant bit value/1024). With the control, the average cycle of the pulse signal outputted from 9-bit input frequency divider 410 for the length of time when at least 1024 pulses are generated coincides with the cycle of the pulse signal obtained through tentative frequency division performed by 19-bit input frequency divider on the basis of the 19-bit division ratio held in 19-bit register 407 used under the same conditions without any changes (i.e., including the fractional portion).

Hence, the above-mentioned average cycle means the average cycle for the period when a predetermined number (specifically, 1024 in this embodiment) of pulses occurs in the pulse signal outputted by frequency divider 410.

Figure 12:
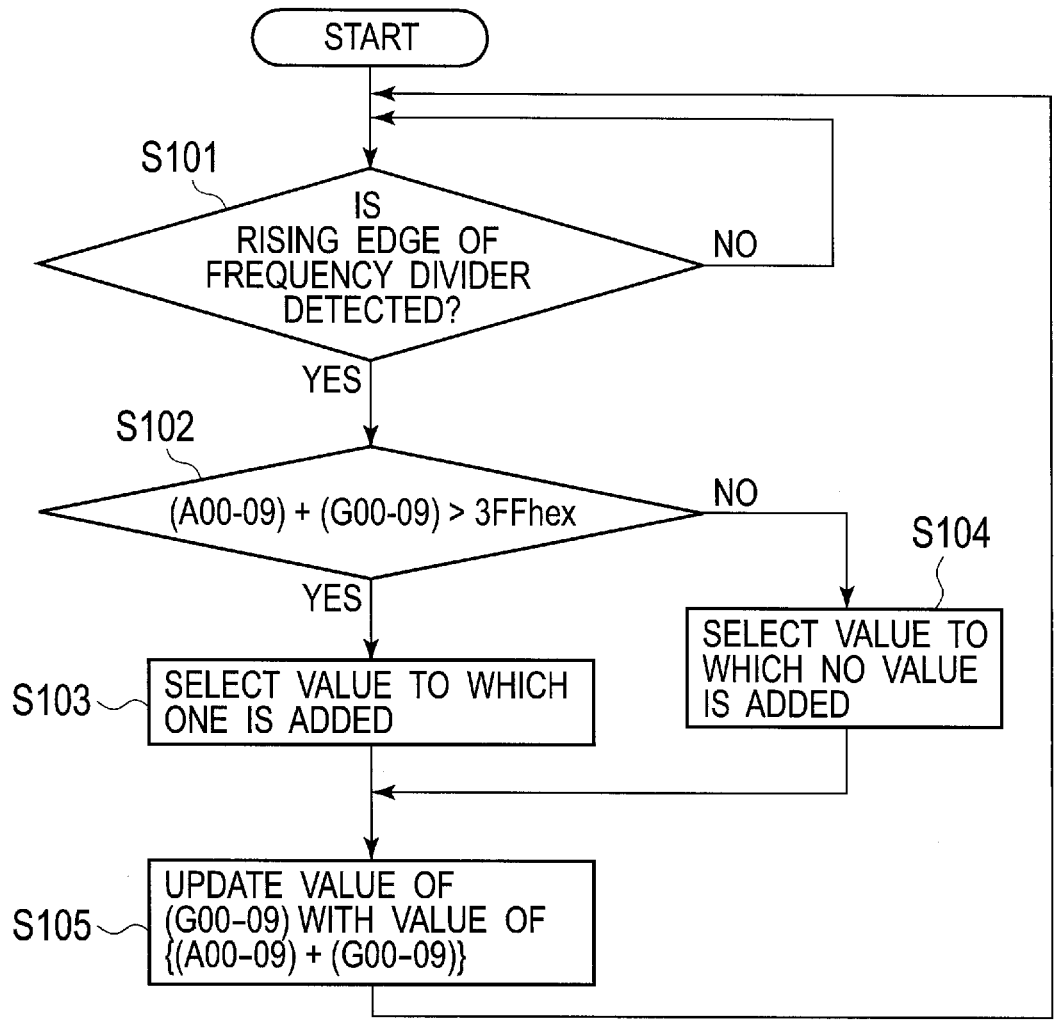
FIG. 12 is a flowchart illustrating a series of processes executed by an error-holding register.

FIG. 12 is a flowchart illustrating a series of processes executed by error-holding register 411 to obtain the value E in the equation above. Note that error-holding register 411 is actually implemented by hardware.

At the beginning of the series of processes, the rising edges of the pulse in the pulse signal outputted by frequency divider 410 are monitored (at step S101). If the rising edge of a pulse is detected (Yes at step S101), a monitoring is conducted (at step S102) as to whether or not the 11-bit value, obtained by adding together the 10 least significant bit value from 19-bit register 407 and the 10-bit register-held value held in error-holding register 411, is larger than 3FFhex. If the 11-bit value is larger than 3FFhex (Yes at step S102), the selection signal is set at "H" to make frequency-division selector 409 select the value "D+1" (step S103). If, in contrast, the 11-bit value is not larger than 3FFhex (No at step S102), the selection signal is set at "L" to make frequency-division selector 409 select the value "D" (at step S104). Then, the 10 least significant bit value of 19-bit register 407 is added to the 10-bit register-held value held in error-holding register 407, and thereby updates the 10-bit register-held value held in error-holding register 407. Then, the process at step S101 is performed again together with the subsequent processes, repeatedly.

With the series of processes described above, error-holding register 411 outputs a selection signal with the same characteristics as those of the value E in the equation given above. Specifically, for example, as the 10 least significant bit value of 19-bit register 407 is larger, the selection signal makes the selection signal to be set at "H" more frequently and frequency-division selector 409 selects the value "D" less frequently. Thus, the precision of the average cycle of the pulse signal outputted by 9-bit input frequency divider 410 can be raised up to the level that can only be achieved by a 19-bit input frequency divider. Incidentally, the description given above is valid as long as the division ratio held in 19-bit register 407 does not change at all. However, even if the division ratio held in 19-bit register 407 does change and as a result values change within a cycle of less than 1024 pulses, the average value of the left side of the equation above becomes almost equal to the average value of the right side of the equation for a certain unit of time.

Next, a description is given of the overall print actions performed by the image formation apparatus with the above-described configuration.

Print data described in a page description language (PDL) or the like is inputted into image formation apparatus 11 shown in FIG. 1 from an unillustrated external device via host interface 150 (see FIG. 2). The data thus inputted is converted to bitmap data by command/image processor 151 (see FIG. 2), Image formation apparatus 11 controls the temperature of image-fixation-unit heater 259 in accordance with the value detected by thermistor 165 (see FIG. 2), and thereby makes the heater roller of image-fixation unit 28 have a predetermined temperature. Then, image formation apparatus 11 starts the print actions.

Print sheet 30 set in sheet-holder cassette 24 is picked up and fed by hopper roller 22 and then transported by a pair of register rollers 23 onto image-transfer belt 26 at a timing synchronized with the image formation actions to be described later. Four image formation units 12 form toner images on the surfaces of their respective photosensitive drums 13 in image formation units 12 through an electrophotographic process. On the surface of each photosensitive drum 13, an electrostatic latent image is formed by LED head 15 that emits light in accordance with the bitmap data. The electrostatic latent image is developed by development roller 16, and thereby a toner image is formed on the surface of each photosensitive drum 13.

The toner images formed on the surfaces of photosensitive drums 13 are transferred, one after another, to the surface of print sheet 30 being transported on image-transfer belt 26, and laid one upon another on the surface of print sheet 30. To transfer the toner images, image-transfer bias voltages are applied to image-transfer rollers 17K, 17Y, 17M, and 17C, which are provided in such a manner as to respectively face photosensitive drums 13K, 13Y, 13M, and 13C. After the transferring of toner images of the four colors, one upon another, onto the surface of print sheet 30, the transferred toner images are fixed by image-fixation unit 28 to the surface of print sheet 30. After that, print sheet 30 is transported furthermore, and is then discharged to sheet-stacker 29.

Next, description is given of the actions of image-transfer-bias generator 163.

As shown in FIG. 3, four image-transfer-bias generators 163C, 163M, 163Y, and 163K are controlled independently of one another. In each of three image-transfer-bias generators 163M, 163Y, and 163K for the M-color, Y-color, and K-color print systems, the image-transfer bias voltage is controlled within a range from 220V to 5000V. In image-transfer-bias generator 163C for the C-color print system, the image-transfer bias voltage is controlled within a range from 54V to 7000V. The image-transfer bias voltage to be applied to each image-transfer roller 17 is set at a value at least equal to 1000V under normal circumstances. Hence, the fact that 220V and 54V are the minimum values of the above-mentioned ranges causes no problem. In addition, it is not necessary for image-transfer-bias generators 163M, 163Y, and 163K to apply so high a voltage as 5000V, and it is not necessary either for image-transfer-bias generator 163C to apply so high a voltage as 7000V. Accordingly, the output controls are performed with 5000V and 7000V being the maximum values as described later.

Printer-engine controller 153 outputs target-value data (10 bit) 211 for the four-color print systems, which instructs the voltages to be applied to the four image-transfer rollers 17. In addition, when, image formation apparatus 11 is powered ON, printer-engine controller 153 outputs an "L-level" reset signal to reset various setup items in output controller 160. Then, with a serial communication signal SCI, printer-engine controller 153 transmits setup values in control-step-value table 403, four counter-maximum-value tables 401 for the four-color print systems and counter-minimum-value table 402 held in memory 460 of output controller 160 shown in FIG. 6. In addition, printer-engine controller 153 outputs target-value data (10 bit) 211 for the four-color print systems. Note that the image-transfer bias voltage has to be applied while print sheet 30 is passing through each nip portion between photosensitive drum 13 and image-transfer roller 17. Accordingly, while print sheet 30 is passing through each nip portion, ON signal 210 for the print system of the corresponding color is switched from an "L-level" signal to an "H-level" signal.

Immediately in response to the input of "H-level" ON signal 210, output controller (ASIC) 160 outputs piezoelectric-transformer drive pulses through corresponding output port OUT to piezoelectric-transformer drive circuits 203. Each piezoelectric-transformer drive circuit 203 performs switching on the 24-V DC voltage supplied from DC power source 201, and thereby applies a sinusoidal half wave with a peak of 100V approximately to the primary side of the corresponding one of piezoelectric transformers 204 and 208. In response to the input to the primary side, each of piezoelectric transformers 204 and 208 outputs a raised-voltage output to the secondary side in accordance with the drive frequency (i.e., the frequency of the transformer-drive pulse). Each rectifier circuit 205 outputs a DC image-transfer bias voltage rectified by the diode and the capacitor.

Each output-voltage-converter circuit 207 outputs a feedback voltage signal to corresponding input port ADC of output controller 160. The feedback voltage signal is created by converting the image-transfer bias voltage. Through the conversion, the image-transfer bias voltage from 0V to 10 kV, which is the high-voltage output of corresponding rectifier circuit 205, is lowered down to a range from 0V to 5V. As shown in FIG. 4, the image-transfer bias voltage is applied to the core metal of image-transfer roller 17 via resistor 314. Output controller 160 makes 5-V 10-bit ADC 414 perform an analog-to-digital conversion on the feedback voltage inputted into input port ADC, and thereby, the feedback voltage is converted to a digital value of 000hex to 3FFhex.

Accordingly, printer-engine controller 153 sets up 10-bit target values for the four-color print systems. To set up the 10-bit target values, 10-bit target-value data is used where image-transfer bias voltages of 0V to 10 kV correspond to digital values of 000hex to 3FFhex. A 10-bit target value of 00hex to 1FFhex corresponding to an image-transfer bias voltage of 0V to 5000V is set up for each of the M-color, Y-color, and K-color print systems, while a 10-bit target value of 000hex to 2CChex corresponding to an image-transfer bias voltage of 0V to 7000V is set up for the C-color print system.

Accordingly, as shown in FIG. 3, output controller 160 controls individually four image-transfer-bias generators 163 in a manner that target-value data (10 bit) 211 for each of the four-color print systems inputted from printer-engine controller 153 can coincide with the detection data (10 bit) obtained by an analog-to-digital conversion performed on the feedback voltage inputted to the corresponding one of four input ports ADC. Consequently, an image-transfer bias voltage of 0V to 7000V corresponding to target-value data 000hex to 2CChex can be obtained for the C-color print, system. On the other hand, an image-transfer bias voltage of 0V to 5000V corresponding to target-value data 000hex to 1FFhex can be obtained for each of the M-color, Y-color, and K-color print systems.

More details of the above-described control are described below.

Output controller 160 (see FIG. 6) receives an input of a 50-MHz clock signal—the reference clock—from reference-clock transmitter 316 (see FIG. 4). When image formation apparatus 11 is powered ON and the reset signal inputted from printer-engine controller 153 becomes the "L-level," various setup items are reset. Then, by means of serial communication signal SCI, output controller 160 receives data held in the tables in memory 460. Appropriate values are set up in the internal memory of control-step-value table 403, four counter-maximum-value tables 401 and counter-minimum-value table 402 for the four-color print systems, and the like.

In FIG. 4 illustrating the M-color print system, when ON signal 210 for the M-color print system is switched from the "L-level" to the "H-level" at a predetermined timing described earlier, output controller 160 outputs, through output port OUT (M), the 30% on-duty piezoelectric-transformer drive pulses with an initial 180.5-kHz drive frequency as described later. Note that in FIG. 4 illustrating each of the M-color, Y-color, and K-color print systems equipped with piezoelectric transformers 204, the initial drive frequency is 180.5 kHz, but in FIG. 5 illustrating the C-color print system equipped with piezoelectric transformer 208, the initial drive frequency is 130.2 kHz.

Piezoelectric-transformer drive pulses are applied via resistor 303 to the gate of N-channel power MOSFET 302. By switching ON/OFF the gate of N-channel power MOSFET 302, a 24-V DC power is supplied to drive the resonant circuit including inductor 301, capacitor 305, and piezoelectric transformer 204M. Then, a voltage of sinusoidal half wave with a peak voltage of approximately 100V is applied to primary-side terminal 204a of piezoelectric transformer 204. Note that as shown in FIG. 5, the C-color print system includes capacitor 340 and piezoelectric transformer 208.

The AC output that is outputted through secondary-side output terminal 204b (secondary-side output, terminal 208b in the C-color print system as shown in FIG. 5) of piezoelectric transformer 204 (piezoelectric transformer 208 in the C-color print system) is rectified by rectifier circuit 308, and is then applied as the image-transfer bias voltage to image-transfer roller 17M via resistor 314. The image-transfer bias voltage is converted by the output-voltage converter to a feedback voltage signal with a voltage that is approximately 1/2000 of the voltage of the image-transfer bias voltage. The feedback voltage signal thus created is outputted to corresponding input port ADC of output controller 160. Output controller 160 makes 5-V input 10-bit ADC 414 perform an analog-to-digital conversion of the feedback voltage inputted into input port ADC into a digital value of 000hex to 3FFhex. Output controller 160 controls the frequency of the piezoelectric-transformer drive pulses outputted through output port OUT (M) in a manner that the digital value obtained by the above-described conversion can coincide with the corresponding target-value data (10 bit) 211.

Figure 11:
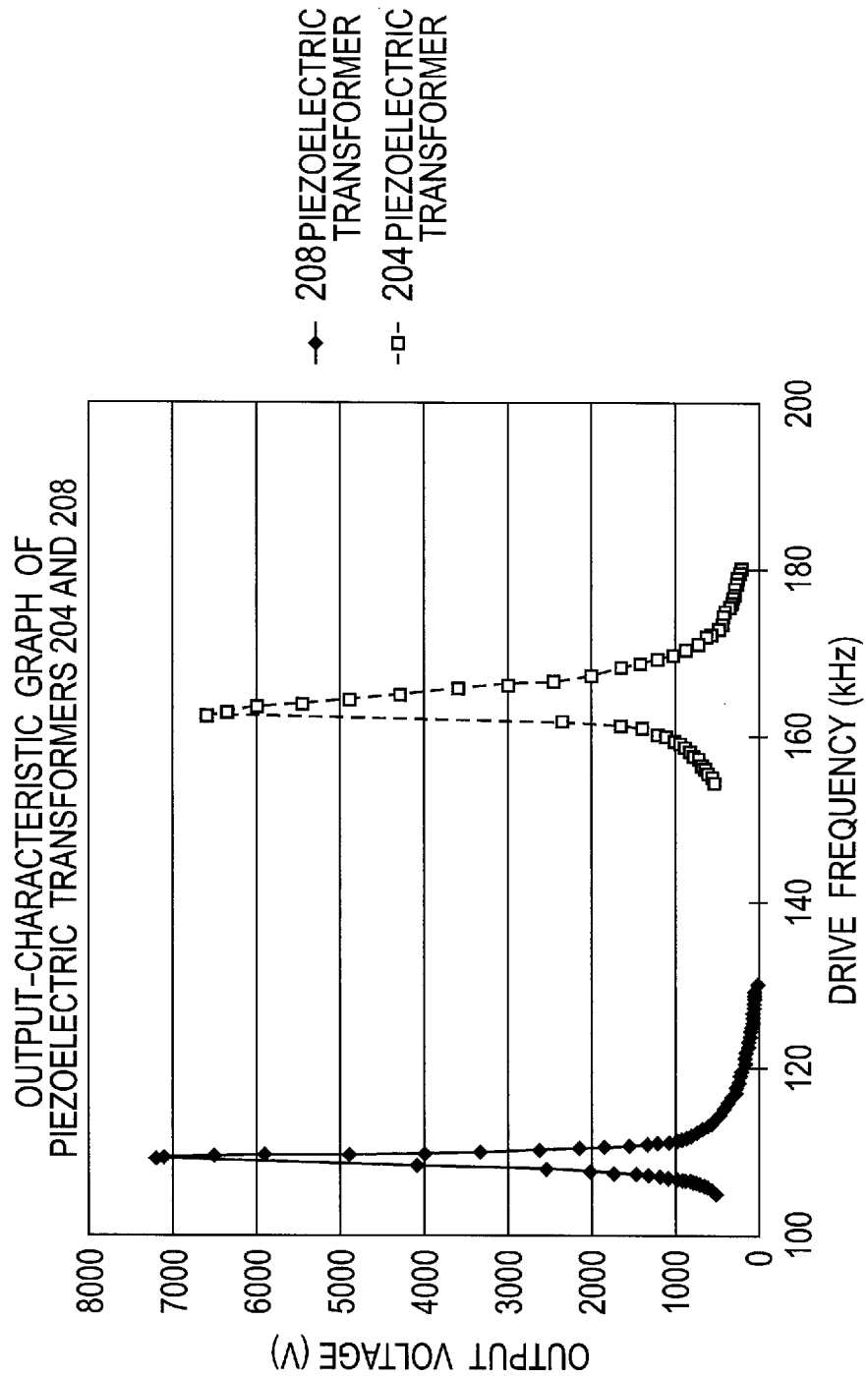
FIG. 11 is a characteristic diagram illustrating the relationship between the drive frequency inputted into the image-transfer-bias generator for cyan (C) color and the image-transfer bias voltage outputted by the image-transfer-bias generator portion for cyan (C) color, and also illustrating the relationship between the drive frequency inputted into each of the image-transfer-bias generators for magenta (M), yellow (Y), and black (K) colors and the image-transfer bias voltage outputted by each of the image-transfer-bias generators for magenta (M), yellow (Y), and black (K) colors.

FIG. 11 is an output-characteristic graph illustrating: the relationship between the frequency (kHz) of the piezoelectric-transformer drive pulses inputted into each of image-transfer-bias generators 163M, 163Y, and 163K each equipped with piezoelectric transformer 204 (as shown in FIGS. 3 and 4) and the image-transfer bias voltage (V) outputted from that one of image-transfer-bias generators 163; and the relationship between the frequency (kHz) of the piezoelectric-transformer drive pulses inputted into image-transfer-bias generator 163C equipped with piezoelectric transformer 208 (as shown in FIGS. 3 and 5) and the image-transfer bias voltage (V) outputted from image-transfer-bias generators 163. As described earlier, in each of the M-color, Y-color, and K-color print systems each equipped with piezoelectric transformer 204, the piezoelectric-transformer drive pulses are controlled in a manner that the initial drive frequency of 180.5 kHz can be gradually lowered, and can eventually reach the drive frequency that allows the target voltage to be obtained. In the C-color print system equipped with piezoelectric transformer 208, similar control is performed with the initial drive frequency of 130.2 kHz as described later in more detail.

Next, how the circuit of output controller (ASIC) 160 works is described by referring to FIG. 6.

Output controller 160 acts in synchronization with a 50-MHz clock signal. When ON signal 210 is switched from the "L-level" to the "H-level," output controller 160 outputs, through output selectors 412, piezoelectric-transformer drive pulses with initial drive frequencies. As described earlier, the initial drive frequency at that, moment for each of the M-color, Y-color, and K-color print systems is 180.5 kHz whereas the initial drive frequency at that moment for the C-color print system is 130.2 kHz. In addition, the image-transfer bias voltage at that moment for each of the M-color, Y-color, and K-color print systems is 54V whereas the image-transfer bias voltage at that moment for the C-color print system is 220V as described later in more detail.

At that moment, comparators 406 each configured, to compare the 10-bit feedback voltage (digital) with the 10-bit target-value data set up at a target voltage of, for example, 4000V or higher outputs an "H-level" signal. Hence, arithmetic unit 405 performs an addition processing to increase the value of the 19-bit division ratio held in 19-bit register 407. As described earlier, pulse-output generator 450 generates 30% on-duty piezoelectric-transformer drive pulses with an average cycle of ((19-bit division ratio value)×20 nsec÷1024). Hence, the frequency becomes lower. As shown in FIG. 11, a high image-transfer bias voltage is outputted along with the decrease in the drive frequency of piezoelectric-transformer drive pulses. The increasing image-transfer bias voltage eventually exceeds the target voltage, and at that moment the output of comparator 406 becomes the "L-level"

signal. Then, arithmetic units 405 perform a subtraction processing to make the 19-bit division ratio held in 19-bit register 407 smaller.

Image-transfer-bias generator 163 works to make the high-output image-transfer bias voltage coincide with the target voltage set up by target-value data 211 by performing the above-described negative feedback control. The following paragraphs describe more details of how image-transfer-bias generator 163 works. In the following description, numerical values n with a symbol (or symbols) M, Y, K, and C in parenthesis—e.g., n(M, Y, K) or n (C)—are used to mean that the numerical values are valid only for the print system (or systems) of a particular color (or colors) indicated by the symbol (or symbols).

In synchronization with the input of an "L-level" reset signal, arithmetic unit 405 sets a 19-bit value of 45400hex (M, Y, K) or 60000hex(C) in 19-bit register 407, and clears error-holding register 411 to have a straight-zero value. The above-mentioned 45400hex(M, Y, K) and 60000hex(C) are determined by using 115hex (M, Y, K) and 180hex(C)—which are the counter's minimum values held in counter-minimum-value table 402—as the values of the 9 most significant bits and a value 000hex is used as the value of the 10 least, significant bits.

While ON signal 210 is at the "L-level," that is, before ON signal 210 becomes the "L-level," output selectors 412 output "L-level" outputs. Consequently, none of piezoelectric transformers 204 and 208 is driven. In addition, while ON signal 211 is at the "L-level," comparators 406 are forced to output "L-level" outputs. Hence, each arithmetic unit 405 performs a subtraction processing. Note that the values held in 19-bit register 407 are 45400hex(M, Y, K) and 60000hex(C), and also that the output of control-step-value table 403, which is to be described later, is always a positive 9-bit value, meaning that the output is always at least 0001hex. Accordingly, the results of the subtraction become smaller than 45400hex(M, Y, K) and 60000hex(C).

At the time of the subtraction, each arithmetic unit 405 compares the value of the 9 most significant bits of the subtraction result with the counter minimum value of counter-minimum-value table 402—i.e., 115hex(M, Y, K) or 180hex (C). If the value of the 9 most significant bits of the subtraction result is smaller than 115hex (M, Y, K) or 180hex (C), the value of the 9 most significant bits of 19-bit register 407 is set at 115hex(M, Y, K) or 180hex(C), and the value of the 10 least significant bits is set at 000hex. To put it differently, the 19-bit value held in 19-bit register 407 is set at 45400hex(M, Y, K) or 60000hex(C). Consequently, while ON signal 210 is at the "L-level," the value held by each 19-bit register 407 is kept at a value determined by the counter minimum value held in counter-minimum-value table 402.

Accordingly, while ON signal 210 is at the "L-level," frequency divider 410 receives an input of a 9-bit value of 115hex(M, Y, K) or 180hex(C), and outputs 30% on-duty pulses at a fractional-277 frequency (180.5 kHz) (M, Y, K) or a fractional-384 frequency (130.2 kHz) (C). The pulses are outputted to both output selector 412 and error-holding register 411. Note that since ON signal 210 is still at the "L-level," the pulses are not outputted from output selector 412. In addition, error-holding register 411 keeps 000hex as the register-held value. Output-voltage-converter circuit 207 outputs 0V because the detected image-transfer bias voltage is 0V. Then, 10-bit ADC 414 performs an analog-to-digital conversion on this 0-V image-transfer bias voltage at a cycle of the rising edges of the pulses in the selection pulse signal (see FIG. 13) inputted from timer 404, and then outputs a 10-bit value of 000hex.

As described earlier, printer-engine controller 153 outputs a reset signal at the time of initialization, such as the time when image formation apparatus is powered ON. Then, printer-engine controller 153 transmits serial communication signal SCI, and thereby sets up values to be held in the tables in memory 460 in output controller 160. In FIGS. 7 and 8, the data with the addresses from 00hex to F7hex are the data held in control-step-value table 403. In FIGS. 7 and 8, the data with the address of F8hex(C), the address of F9hex(M), the address of FAhex(Y), and the address of FBhex(K) are the data held in counter-minimum-value table 402. In FIGS. 7 and 8, the data with the address of FChex(C), the address of FDhex(M), the address of FEhex(Y), and the address of FFhex(K) are the data held in counter-maximum-value table 401.

Accordingly, the counter minimum value is 115hex(M, Y, K) or 180hex(C) whereas the counter maximum value is 132hex(M, Y, K) or 1CChex (C). Memory 460 is an SRAM or a flash memory. So, by inputting another reset signal after the data transmission, a counter minimum value in accordance with the transmitted data is set in 19-bit register 407.

Arithmetic unit 405 compares the value of the 9 most significant bits of the 19-bit division ratio—the result of the addition—with the counter maximum value held in counter-maximum-value table 401. If the counter maximum value is smaller than the result of the addition, the counter maximum value is set to be the value of 9 most significant bits of 19-bit register 407, and 3FF is set to be the value of the 10 least significant bits. Accordingly, the substantially maximum value of the 19-bit division ratio held in 19-bit register 407 becomes 4CBFFhex(M, Y, K) or 733FFhex(C).

Before starting the print actions, printer-engine controller 153 starts outputting 10-bit target-value data 211, for example, after the outputting of the reset signal when image formation apparatus 11 is powered ON. For example, the outputted 10-bit target-value data 211 is: 198hex corresponding to 4000V for the K-color print system; 1CChex corresponding to 4500V for the Y-color print system; 1FFhex corresponding to 5000V for the M-color print system; and 256hex corresponding to 600V for the C-color print system. As described earlier, in output controller 160 shown in FIG. 6, each of the constituent elements with fourfold blocks has four members for the K-color, Y-color, M-color, and C-color print systems. Arithmetic operations are performed sequentially at different timings in synchronization with the selection pulse signals outputted from timer 404 and having pulses occurring repeatedly in each selection pulse signal. The timings at which pulses occur shift from one selection pulse signal to the next so that no two pulses occur simultaneously in any two of the four selection pulse signals. As the output of each frequency divider 410, piezoelectric-transformer drive pulses that are always controlled in the above-described way are outputted.

After the setting up of target-value data, ON signal 210 for each print system is switched from the "L-level" to the "H-level" at a predetermined timing, that is, while print sheet 30 is passing through each nip between photosensitive drum 13 and image-transfer roller 17.

As described earlier, while ON signal 210 is at the "L-level," the output of comparator 406 is fixed to the "L-level," and arithmetic unit 405 decreases the value of 19-bit register 407. In the C-color print system, for example, at the time of the initialization when image formation apparatus 11 is powered ON, the value of the 9-bit counter minimum value held in counter-minimum-value table 402 is 180hex. Hence, a 19-bit value of 60000hex is set in 19-bit register 407. In addition, the value of the 8 most significant bits (MSB) (i.e., 11SB to 18SB) after the MSB of the 19-bit digital value held in 19-bit register 407 is transmitted to control-step-value table 403 as the value of the address (input value). Specifically, a value of 80hex is transmitted in this case as the value of the address.

As shown in FIG. 7, the 8-bit input value corresponds to a 9-bit output value of 1FFhex corresponding to the 8-bit input value in control-step-value table 403 is outputted to arithmetic unit 405. Arithmetic unit 405 obtains a division ratio (19-bit value) of 5FE01hex by subtracting 1FFhex from 60000hex. Then, the value of the 9 most significant bits of this 19-bit division ratio—specifically, 17Fhex—is compared with the counter minimum value of 180hex. In this case, the value of the 9 most significant bits is smaller than the counter minimum value. The counter minimum value of 180hex is inputted as the value of the 9 most significant bits and a value of 000hex is inputted as the value of the 10 least significant bits. Similar processing is repeated as long as ON signal 210 is at the "L-level." Accordingly, 19-bit register 407 keeps 60000hex for the C-color print system. In a similar manner, 19-bit register 407 keeps 45400hex for each of the M-color, Y-color, and K-color print systems. Note that frequency-division selector 409 outputs piezoelectric-transformer drive pulses with an initial drive frequency of 180.5 kHz(M, Y, K) and piezoelectric-transformer drive pulses with an initial drive frequency of 130.2 kHz(C) at that moment.

FIG. 9 shows data illustrating the relationships between 19-bit division ratios held in 19-bit register 407 and respective output voltages (image-transfer bias voltages) outputted from image-transfer-bias generator 163C for cyan (C) color print system equipped with piezoelectric transformer 208 when image-transfer-bias generator 163C is driven with the 19-bit division ratios. FIG. 10 shows data illustrating the relationships between 19-bit division ratios held in 19-bit register 407 and respective output voltages (image-transfer bias voltages) outputted from each of image-transfer-bias generators 163M, 163Y, and 163K for magenta (M), yellow (Y), and black (K) color print systems each equipped with piezoelectric transformer 204 when each image-transfer-bias generator 163 is driven with the 19-bit division ratios.

In this state, if ON signal 210 is switched to the "H-level" at the above-mentioned predetermined timing, each output selector 412 outputs piezoelectric-transformer drive pulses to corresponding piezoelectric-transformer drive circuit 203, and, as shown by the data in FIGS. 9 and 10, the initial image-transfer bias voltage (equivalent to the minimum value) of 220V (M, Y, K) or 54V (C) is outputted. On the other hand, each comparator 406 outputs an "H-level" output as long as the feedback voltage value (10 bit), from ADC 414, corresponding to the above-mentioned image-transfer bias voltage, is lower than: 198hex corresponding to the target value 4000-V for the K-color print system; 1CChex corresponding to the target value 4500-V for the Y-color print system; 1FFhex corresponding to the target value 5000-V for the M-color print system; and 265hex corresponding to the target value 6000-V for the C-color print system.

In the meanwhile, each arithmetic unit 405 increases the value of the 19-bit division ratio held in 19-bit register 407 through addition processing, and thereby decreases the drive frequency of the piezoelectric-transformer drive pulses. Hence, as shown in FIG. 11, the image-transfer bias voltage increases, and eventually exceeds the target voltage. Once the image-transfer bias voltage exceeds the target voltage, the output of comparator 406 is switched to the "L-level," and the value of the 19-bit division ratio held in 19-bit register 407 is decreased by the subtraction processing performed by arithmetic unit 405. With the above-described negative feedback control, image-transfer-bias generator 163 works in such a manner that the high-output image-transfer bias voltage can coincide with the target voltage determined by target-value data 211.

Image-transfer-bias generator 163 thus works in a manner that the image-transfer bias voltage for the print system where ON signal 210 becomes the "H-level" can promptly coincide with the target voltage determined by target-value data 211.

In FIGS. 7 and 8, of the data in memory 460, the data with addresses from 00hex to F7hex are the data held in control-step-value table 403. The range of the addresses corresponds to the value of the 8 most significant bits after the MSB of the division ratio at the time when frequency divider 410 outputs piezoelectric-transformer drive pulses with a variable frequency range from 99.4 kHz to 195.3 kHz on the basis of the variable range from 100hex to 1F7hex of the value of the 9 most significant bits of the 19-bit division ratio held in 19-bit register 407.

For example, as the piezoelectric-transformer drive pulses are outputted when, for example, ON signal 210 rises from the "L-level" up to the "H-level," output selectors 412 output the piezoelectric-transformer drive pulses with initial drive frequencies of 180.5 kHz(M, Y, K) and 130.2 kHz(C) in accordance with the values of 115hex (M, Y, K) and 180hex (C) held in counter-minimum-value table 402. In this case, the addresses of the 8 most significant bits after the MSB of the division ratio are 15hex(M, Y, K) and 80hex(C). If, in the C-color print system, an image-transfer bias voltage of 5810V, which is close to the target value of 6000V, is outputted, the address with the division ratio of 72400hex (see FIG. 9) is C9hex.

Next, a description is given of how to set up the 9-bit data (output values) in accordance with the addresses (input values) held in control-step-value table 403.

If, for example, a negative feedback control in the C-color print system is started, image-transfer-bias generator 163 firstly drives piezoelectric transformer 208 at a drive-start frequency (130.2 kHz) to output a 54-V image-transfer bias voltage. Then, the image-transfer bias voltage is increased by adding the 9-bit data (output values) held in control-step-value table 403 corresponding to the addresses at that moment sequentially to the 19-bit division ratio held in 19-bit register 407 until the image-transfer bias voltage reaches the target voltage. When the drive is started, around the address of 80hex at that moment, 1FFhex of 9-bit data (output value) is added at each single step of addition as shown in FIG. 7. As the division ratio increases, the 9-bit data (output value) that are added at each single step are decreased. When C7hex is the address of the 9-bit division ratio 71C00hex (the value of the 9 most significant bits is 1C7hex) corresponding to a 4000-V image-transfer bias voltage to be outputted, the value of 9-bit data to be added is 001hex as shown in FIG. 8.

Accordingly, when C7hex is the address of the division ratio of 71C00hex (the value of the 9 most significant bits being 1C7hex) that makes a 4000-V image-transfer bias voltage be outputted, the value of the 9-bit data to be added is 001hex. Even when C8hex is the address of the division ratio of 72000hex (the value of the 9 most significant bits being 1C8hex) obtained by adding 1 to the value of the 9 most significant bits, the value of the 9-bit data is 001hex. At that moment, the image-transfer bias voltage is 4900V. Accordingly, around this address, the division ratio changes at each single step by 1 (i.e., 001hex). So, the voltage change at each single step becomes 0.89V=((4900-4000)V/1024)×1. Note that the number of 1024 corresponds to the amount of change in the 10 least significant bits of the 19-bit division ratio.

When, on the other hand, 80hex is the address of the division ratio of 60000hex (the value of the 9 most significant bits being 180hex) that makes a 54-V image-transfer bias voltage at the start of the drive to be outputted, the value of the 9-bit data to be added is 1FFhex. Even when 81hex is the address of the division ratio of 60400hex (the value of the 9 most significant bits being 181hex) obtained by adding 1 to the value of the 9 most significant bits, the value of the 9-bit data is 1FFhex. At that moment, the image-transfer bias voltage is 56V. Accordingly, around this address, the division ratio changes at each single step by 511 (i.e., 1FFhex). So, the voltage change at each single step becomes 0.998V=((56-54) V/1024)×511.

As described above, 9-bit data is set in control-step-value table 403 in a manner that the change at each single step can be substantially constant, specifically, approximately IV in this case, until the output voltages starting at least from the initial output voltages of 54V for the C-color print system and 220V for each of the M-color, Y-color, and K-color print systems reach the maximum values—specifically, 7000V for the C-color print system and 5000V for each of the M-color, Y-color, and K-color print systems—even if piezoelectric transformers 208 (for the C-color print system) and 204 (for each of the M-color, Y-color, and K-color print systems), as shown in FIG. 11, are used with output characteristics that change non-linearly in accordance with the drive frequency. Accordingly, even in the case where the image-transfer bias voltage is changed around the target voltage by the negative feedback control, a constant-voltage control can be continued because the unit amount of change in the voltage is approximately 1V.

Once ON signal 210 is switched from the "H-level" to the "L-level," the 19-bit division ratio in 19-bit register 407 is gradually decreased back to the counter minimum value held in counter-minimum-value table 402. Then image formation apparatus 11 becomes a standby state waiting for the bias application for the next printing (i.e., the next switching ON of ON signal 210).

Next, a description is given of how to actually set up the control-step-value table 403.

FIGS. 14 and 15 are diagrams illustrating an example of how the numerical values in control-step-value table 403 are calculated in image-transfer-bias generator 163 when piezoelectric transformer 208 is used for the C-color print system. By using, for example, two values "D" and "D+1" of the 9 most significant bits corresponding to the integer portion of the value of the 19-bit division ratio held in 19-bit register 407, the difference between the image-transfer bias voltage (output voltage) corresponding to the value "D" and the image-transfer bias voltage (output voltage) corresponding to the value "D+1"—i.e., the amount of change in the output voltage—is obtained through actual measurement. Then, the division ratio that is needed for a 1-V change in the output voltage is obtained. Note that the difference between the image-transfer bias voltage (output voltage) corresponding to the value "D" and the image-transfer bias voltage (output voltage) corresponding to the value "D+1" is caused by the change in the 19-bit division ratio by 1024 (corresponding to the 10 bits for the fractional part). Accordingly, the difference is calculated by dividing 1024 by the amount of change in the output voltage. Control-step-value table 403 is a table storing in advance the 9-bit data thus obtained in the corresponding address (corresponding to the 8 bits of N except the MSB).

Likewise, FIG. 16 illustrates an example of how the numerical values in control-step-value table 403 are calculated in image-transfer-bias generator 163 when piezoelectric transformer 204 is used for each of the M-color, Y-color, and K-color print systems.

By setting up the 9-bit data in control-step-value table 403 in the above-described way, the amount of change in the voltage at each single step of the negative feedback control can be made substantially constant (approximately 1V in this embodiment) irrespective of the drive frequency.

In addition, as shown in FIG. 11, piezoelectric transformer 208 for the C-color print system and piezoelectric transformer 204 for each of the M-color, Y-color, and K-color print systems have different specs and different capacitors—i.e., capacitor C340 for the C-color print system and capacitor C305 for each of the M-color, Y-color, and K-color print systems—so that the drive-frequency ranges of piezoelectric transformer 208 and piezoelectric transformer 204 are not overlapped with each other. Accordingly, single control-step-value table 403 can serve both the C-color print system and each of the M-color, Y-color, and K-color print systems.

As has been described above, the use of the power supply apparatus according to the first embodiment can achieve a constant change in the voltage at each single control step even if the drive frequency-output voltage characteristic of each piezoelectric transformer contains both a section where the change in the output voltage is sharp near the resonant point and a section where the change in the output voltage is only a little as shown in FIG. 11. Accordingly, a stable control is possible within a wide range of the output voltage from the high output voltage near the resonant frequency to the low output voltage. In addition, the drive frequency for the C-color print, system and the drive frequency for each of the M-color, Y-color and K-color print systems are set not to overlap each other. Accordingly, single control-step-value table 403 can serve both the C-color print system and each of the M-color, Y-color, and K-color print systems.

Second Embodiment

Figure 17:
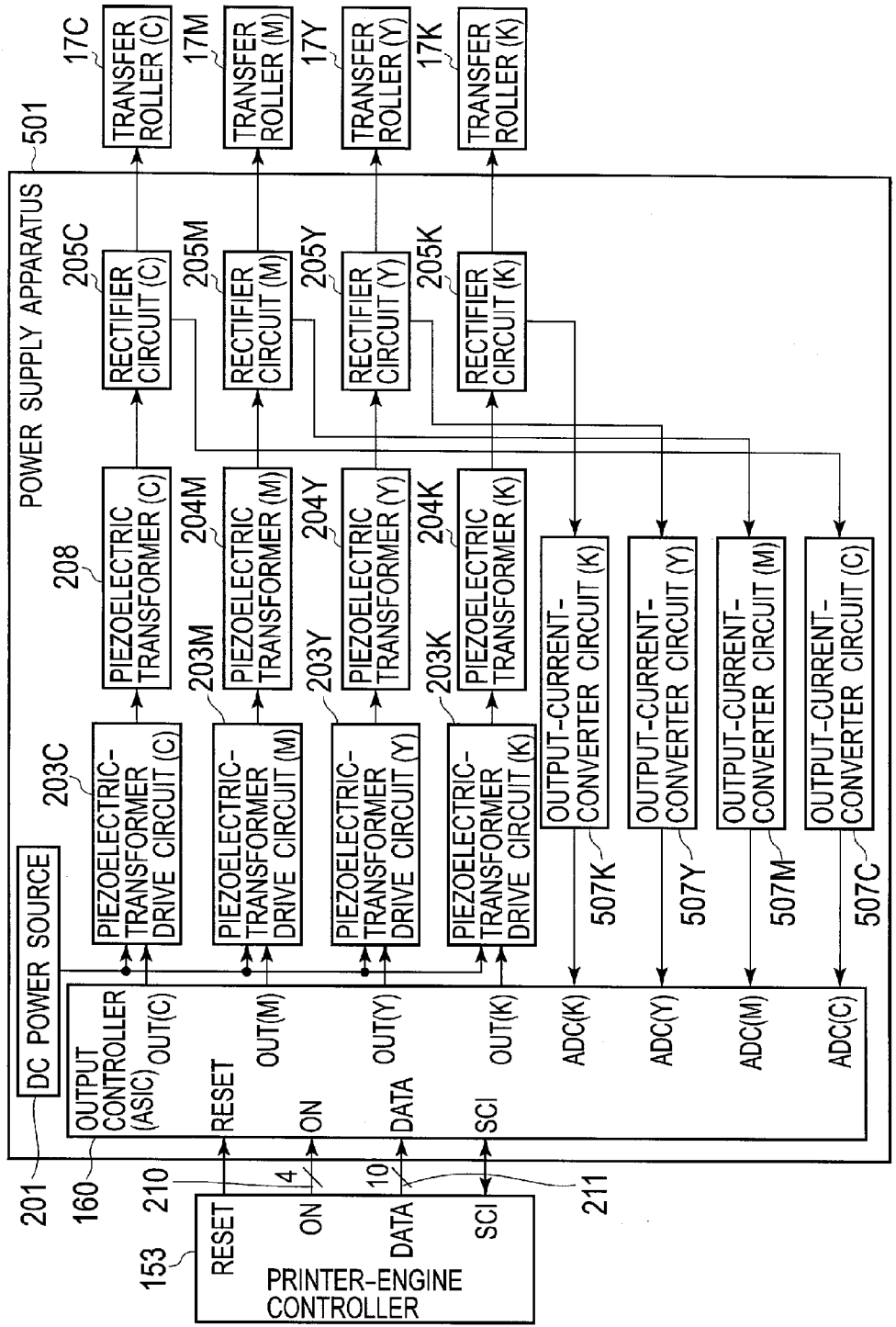
FIG. 17 is a block diagram illustrating the power supply apparatus of a second embodiment.
Figure 18:
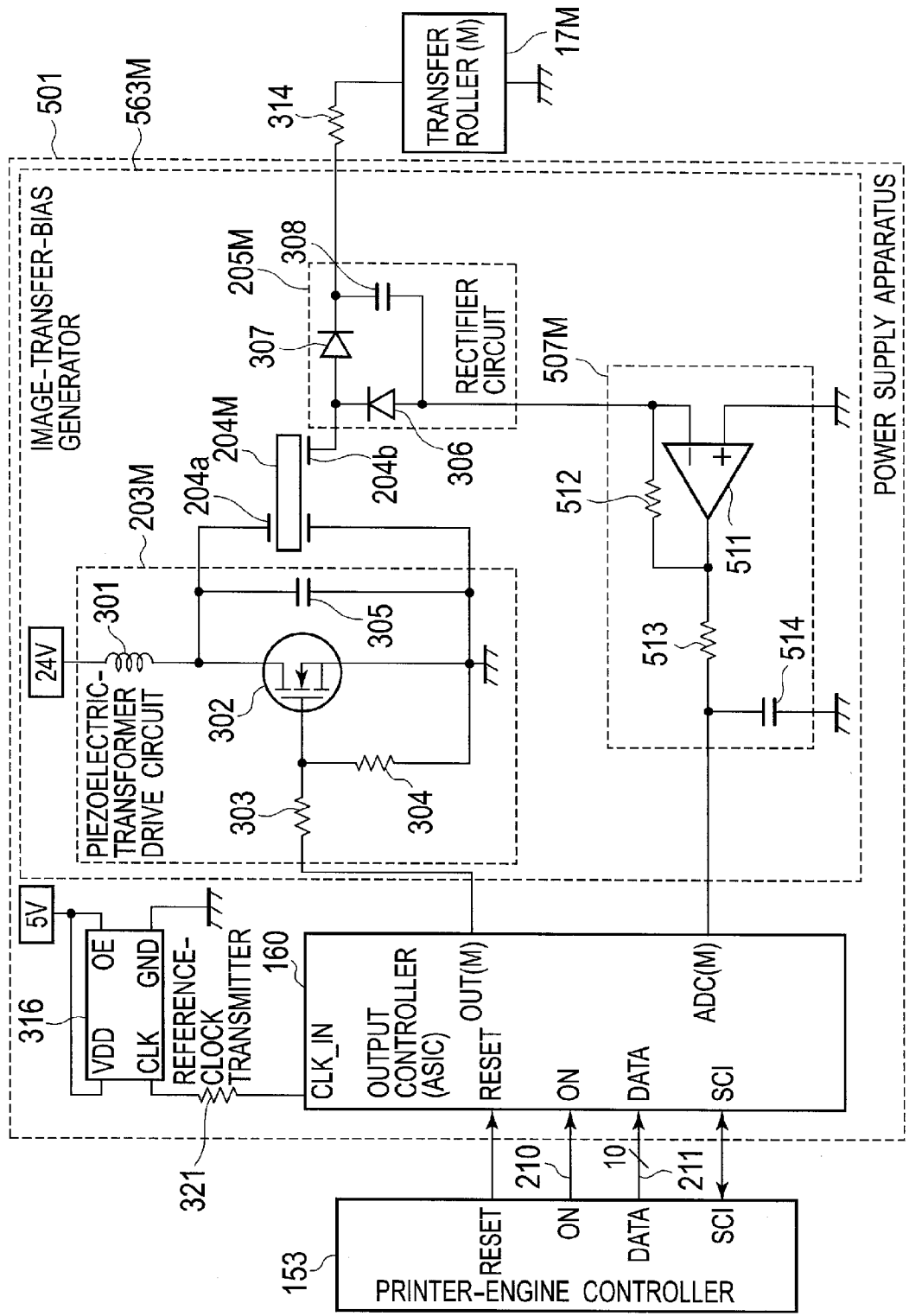
FIG. 18 is a circuit configuration diagram illustrating the circuit configuration of only an image-transfer-bias generator for magenta (M) color together with both a printer-engine controller and an output controller according to the second embodiment.
Figure 19:
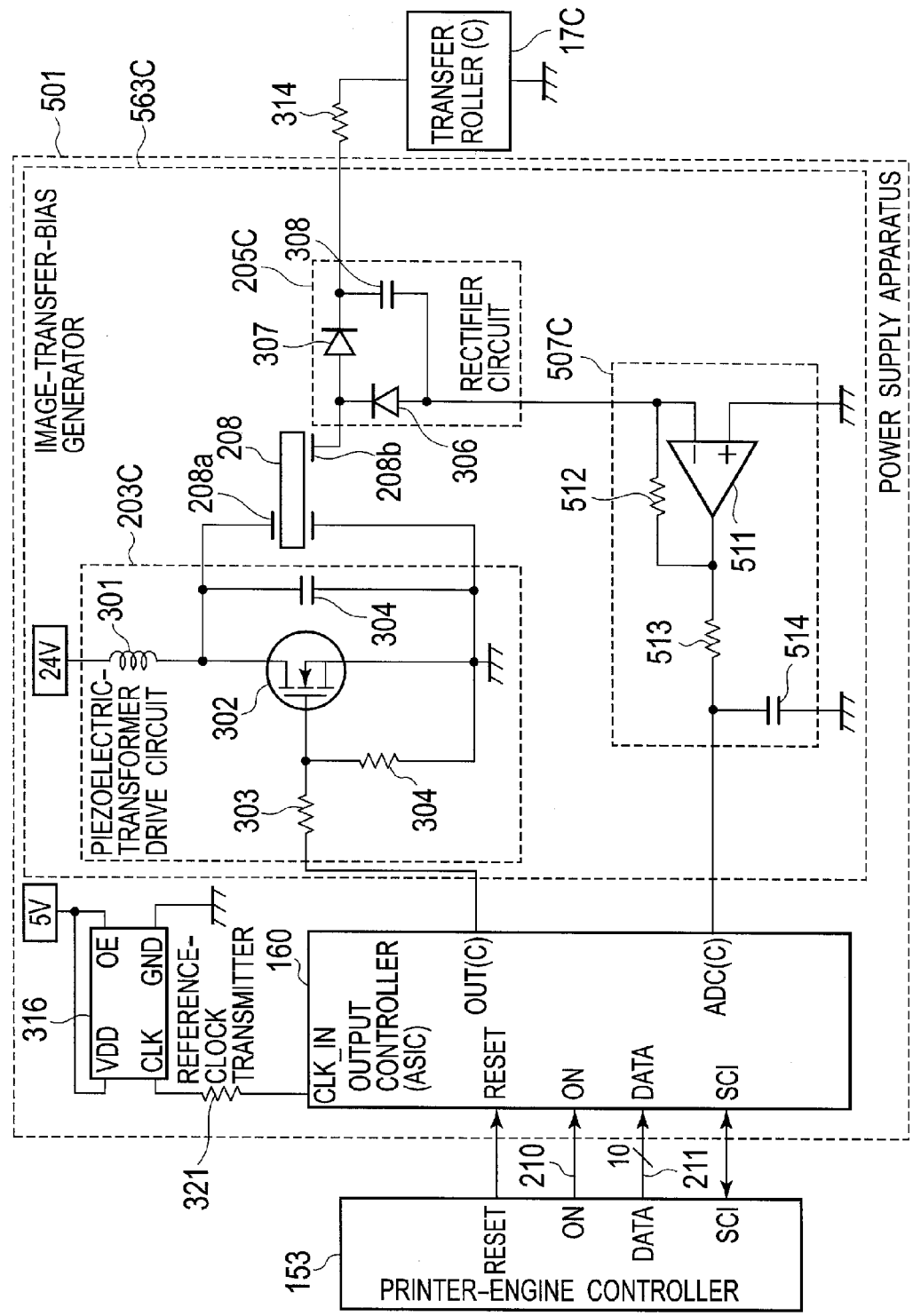
FIG. 19 is a circuit configuration diagram illustrating the circuit configuration of only an image-transfer-bias generator for cyan (C) color together with both a printer-engine controller and an output controller according to the second embodiment.

FIG. 17 is a block diagram illustrating power supply apparatus 501 according to a second embodiment of the invention. FIG. 18 illustrates the circuit configuration of only image-transfer-bias generator 563M for magenta (M) color together with both printer-engine controller 153 and output controller 160. Image-transfer-bias generator 563M for magenta (M) color includes piezoelectric-transformer drive circuits 203M, piezoelectric transformer 204M, rectifier circuits 205M, and output-current-converter circuit 507M. Note that image-transfer-bias generator 563M for magenta (M) color has an identical configuration to both the configuration of image-transfer-bias generators 563Y for yellow (Y) color and the configuration of image-transfer-bias generators 563K for black (K) color. FIG. 19 illustrates the circuit configuration of only image-transfer-bias generator for cyan (C) color 563C together with printer-engine controller 153 and output controller 160.

Image-transfer-bias generator 563 differs from image-transfer-bias generator 163 of the first embodiment shown in FIG. 4 mainly in that output-voltage-converter circuit 207 in the first embodiment is replaced by output-current-converter circuit 507 in the second embodiment. Hence, those portions shared by the image formation apparatus equipped with output-current-converter circuit 507 and the above-described image formation apparatus (see FIG. 1) of the first embodiment are denoted by the same reference numerals used in the first embodiment. Even the drawings and the description for some of such portions are omitted. The description given below in the following paragraphs focuses mainly on the differences between the first and the second embodiments.

Figure 20:
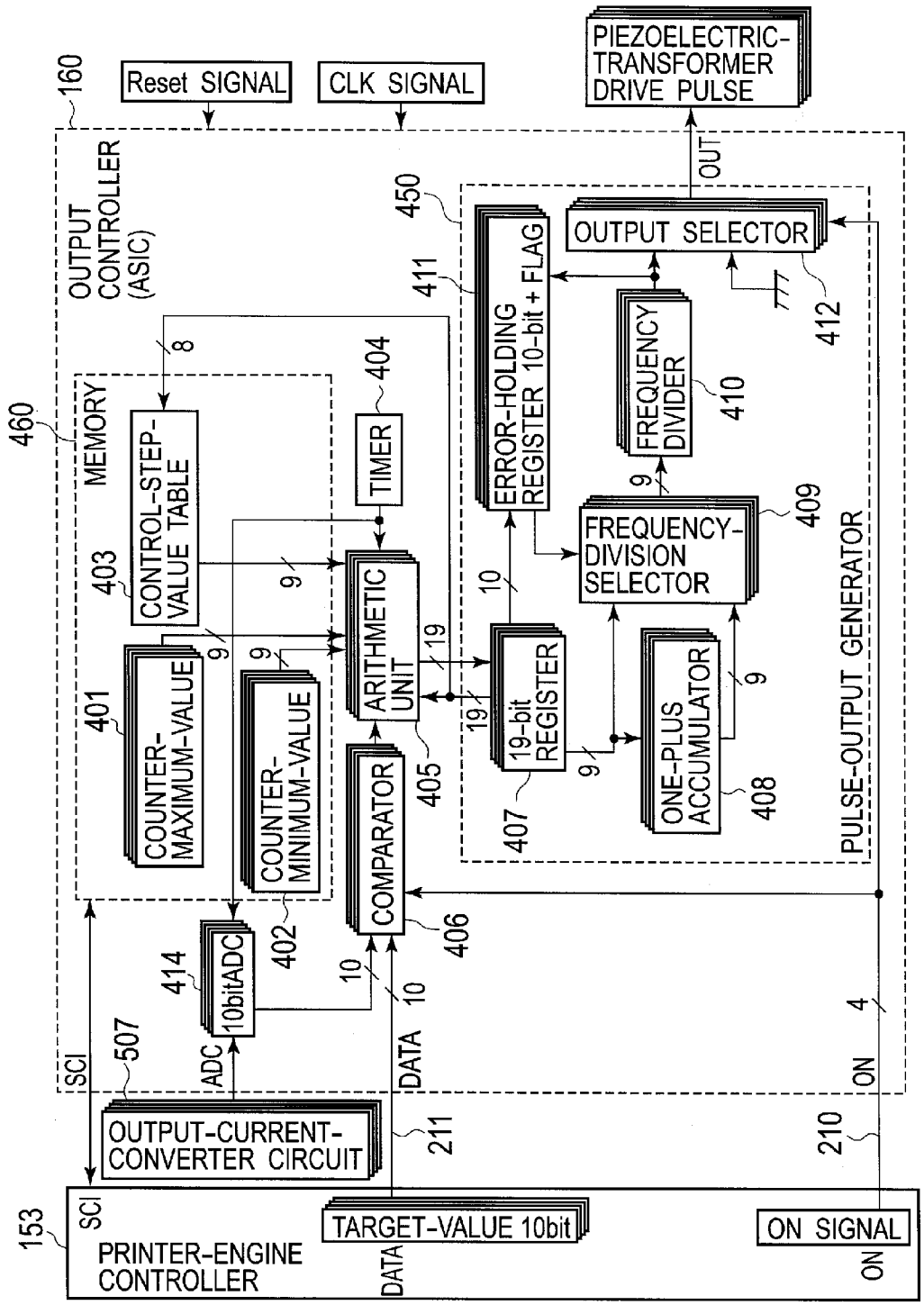
FIG. 20 is a block diagram illustrating functional blocks representing portions included in the output controller formed as an ASIC according to the second embodiment.

As shown in FIG. 18, in output-current-converter circuit 507M, the negative (−) input terminal of operational amplifier 511 is connected, via resistor 512, to the output terminal of operational amplifier 511, and at the same time, is connected to the anode of the diode 306 of rectifier circuit 205M and one of the two terminals of capacitor 308 of rectifier circuit 205M. The output terminal of operational amplifier 511 is connected, via resistor 513, to input port ADC(M) of 5-V input 10-bit ADC 414 in output controller 160, and at the same time is earthed via capacitor 514. The positive (+) input terminal of operational amplifier 511 is directly earthed. Resistor 512 has a resistance of 100 kΩ. Resistor 513 and capacitor 514 together form a smoothing circuit. As shown in FIG. 20, 10-bit ADC 414 of output controller 160 receives the input of the feedback voltage signal from output-current-converter circuit 507 with a configuration described above. The feedback voltage signal changes in accordance with the output current (image-transfer-bias current).

FIG. 19 is a circuit diagram illustrating the circuit configuration of image-transfer-bias generator 563C for cyan (C) color together with printer-engine controller 153 and output controller 160. As described earlier, the differences between this image-transfer-bias generator 563C and each of the image-transfer-bias generators 563M, 563Y, and 563K for the magenta (M) color, the yellow (Y) color, and the black (K) color: shown in FIG. 18 are the specs of piezoelectric transformer 208 and the capacitance of capacitor 330 caused by the different specs of piezoelectric transformer 208. The rest of the configuration shown in FIG. 19 is identical to the configuration shown in FIG. 18 except that the output port OUT and the input port ADC in output controller 160 of FIG. 19 are output port OUT (C) and input port ADC(C) for the cyan (C) color. So, FIG. 19 is not described hereinbelow.

With the configuration described above, image-transfer-bias generator 563 works in such a manner that the image-transfer-bias current supplied to image-transfer roller 17 can coincide with a desired current value. How image-transfer-bias generator 563 works is described in the following paragraphs.

In FIG. 18, the image-transfer-bias current (I) that flows through resistor 314 is controlled in accordance with the output of piezoelectric transformer 204M. A current of the same current value also flows through resistor 512 (R=100 kΩ). The negative terminal of operational amplifier 511 is virtually connected to the ground, so that the output voltage (V) of operational amplifier 511 is obtained by multiplying the image-transfer-bias current (I) by the resistance (R) of resistor 512 (V=I×R). Accordingly, if, for example, the image-transfer-bias current (I) is equal to 50 μA, the feedback voltage (V) that is equal to the output voltage of operational amplifier 511 is equal to 5V.

Hence, if, for example, the image-transfer-bias current for each of the C-color, M-color, Y-color, and K-color print systems is to be controlled to have a constant current value of 10 μA, an output of 0CChex as target-value data (10 bit) 211 is what printer-engine controller 153 has to do to make the above-mentioned control possible. This is because 5-V input 10-bit ADC 414 in output controller 160 shown in FIG. 20 outputs 10-bit 0CChex corresponding to a 1.0-V feedback voltage inputted at that time.

In the above-described way, image-transfer-bias generator 563 can make printer-engine controller 153 output image-transfer-bias currents for each of the C-color, M-color, Y-color, and K-color print systems in accordance with 10-bit target-value data 211 where, for example, image-transfer-bias currents of 0 A to 50 μA correspond to digital values of 000hex to 3FFhex.

Note that in this second embodiment, a 1-V feedback voltage corresponds to a 10-μA drive-bias current. Accordingly, as described earlier in the first embodiment, a substantially constant change, approximately 0.005 (10/2000) μA, in current across single control steps can be achieved in this second embodiment.

As has been described above, the use of the power supply apparatus according to the second embodiment can achieve a constant change in the current at each single control step even if the drive frequency-output voltage characteristics of each piezoelectric transformer contain both a section where a rapid change occurs near the resonant point and a section where the change is quite slow as shown in FIG. 11. Accordingly, a stable control is possible within a wide range of the output current from the high output current to the low output current. In addition, the drive frequency for the C-color print system and the drive frequency for each of the M-color, Y-color and K-color print systems are set not to overlap each other. Accordingly, single control-step-value table 403 can be used, for control of both the C-color print system and each of the M-color, Y-color, and K-color print, systems.

The description of this disclosure is based on an assumption that the power supply apparatus is used for the image transfer in a color, tandem-type image formation apparatus. The invention of this disclosure is also applicable to a monochrome image formation apparatus. The invention of this disclosure is applicable not only to a source of bias voltages to transfer images but also to a source of such bias voltages as the bias for electrical charge or development.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A power supply apparatus comprising:
a switching circuit configured to receive a drive signal and to output a switching signal on the basis of the drive signal;
a first piezoelectric transformer and a second piezoelectric transformer each configured to receive the switching signal and to change an output in accordance with a frequency of the drive signal, wherein the first and second piezoelectric transformers have respective resonance frequencies that are different from each other;
an output converter configured to detect the output and to output a feedback signal proportional to an output level;
a drive-signal generator configured to receive an N-bit division ratio, to divide a reference clock based on the received N-bit division ratio, and to output the drive signal with an average cycle proportional to the N-bit division ratio;
a comparator configured to compare a target data value of a predetermined bit width with a feedback data value of the predetermined bit width obtained by an analog-to-digital conversion of the feedback signal, and to output a comparative output in accordance with a result of the comparison;

a selector configured to output a selection signal indicating which one of the first and second piezoelectric transformers is selected to be controlled;
- a data memory configured to hold preset data in each address, wherein the data memory is configured to store preset data for the first and second piezoelectric transformers at first and second addresses, respectively;
- an arithmetic unit configured to update successively the N-bit division ratio at every step whose processing timing is managed by a timer, by adding or subtracting the preset data read from the data memory to or from the N-bit division ratio in accordance with the comparative output; and
- at least two systems each including the switching circuit, the first and second piezoelectric transformers, the output converter, the drive-signal generator, the comparator, and the arithmetic unit, wherein the arithmetic unit is configured to perform an arithmetic operation to make the feedback data value approach the target data value by a negative feedback control, the arithmetic operation using, as the preset data, data read from an address specified by data with a predetermined bit width of M, with M<N, extracted from the successively updated N-bit division ratio, wherein the arithmetic unit is configured, when the first piezoelectric transformer is selected to be controlled, to read the preset data from the first address in the data memory and to perform an arithmetic operation, and configured, when the second piezoelectric transformer is selected to be controlled, to read the preset data from the second address in the data memory different from the first address and to perform an arithmetic operation, wherein the data memory is a single data memory configured to be shared by the at least two systems, and wherein the at least two systems are configured to alternatively act with sharing the single data memory at the processing timings created by the timer repeatedly and successively from one system to another.

2. The power supply apparatus according to claim 1, wherein the data memory holds, in each address, the preset data that makes an amount of change in the output substantially constant across steps of addition/subtraction processing.

3. The power supply apparatus according to claim 1, wherein the output comprises an output voltage.

4. The power supply apparatus according to claim 3, wherein
the first and second piezoelectric transformers change the output voltage, and
the output converter detects the output level of the output voltage.

5. The power supply apparatus according to claim 1, wherein the output comprises an output current.

6. The power supply apparatus according to claim 5, wherein
the first and second piezoelectric transformers change the output current, and
the output converter detects the output level of the output current.

7. The power supply apparatus according to claim 1, wherein
the first and second piezoelectric transformers are of different kinds using drive signals with different frequency ranges, and
the data memory holds, in different addresses, preset data for the different kinds of the first and second piezoelectric transformers.

8. The power supply apparatus according to claim 7 wherein initial setting values of the N-bit division ratios at a start of the negative feedback control are different among the at least two systems using the different kinds of the first and second piezoelectric transformers, respectively.

9. The power supply apparatus according to claim 1, wherein a variable range of the division ratio is defined by a maximum value and a minimum value held in the data memory.

10. The power supply apparatus according to claim 1, wherein the preset data in the data memory is rewritable.

11. The power supply apparatus according to claim 1, wherein
the drive-signal generator includes:
- a selector configured to alternatively select one from an S-bit division ratio corresponding to S most significant bits (S<N) of the N-bit division ratio and a one-plus S-bit division ratio obtained by adding one to the S-bit division ratio; and
- a frequency divider configured to receive the S-bit division ratio selected by the selector, to divide the frequency of the reference clock based on the received S-bit division ratio, and to output a signal with a cycle proportional to the S-bit division ratio, and wherein the selector is configured to select one of the S-bit division ratio and the one-plus S-bit division ratio in accordance with a value of least significant bits of the N-bit division ratio.

12. The power supply apparatus according to claim 1, wherein the arithmetic unit is configured to perform the arithmetic operation on the division ratio for the first piezoelectric transformer and the arithmetic operation on the division ratio for the second piezoelectric transformer in time series.

13. The power supply apparatus according to claim 12, wherein control of the first piezoelectric transformer and the second piezoelectric transformer is performed in time series and repeated.

14. An image formation apparatus comprising the power supply apparatus according to claim 1.

15. A power supply apparatus, comprising:
- a switching circuit configured to receive a drive signal and to output a switching signal on the basis of the drive signal;
- a piezoelectric transformer configured to receive the switching signal and to change an output in accordance with a frequency of the drive signal;
- an output converter configured to detect the output and to output a feedback signal proportional to an output level;
- a drive-signal generator configured to receive an N-bit division ratio, to divide a reference clock based on the received N-bit division ratio, and to output the drive signal with an average cycle proportional to the N-bit division ratio;
- a comparator configured to compare a target data value of a predetermined bit width with a feedback data value of the predetermined bit width obtained by an analog-to-digital conversion of the feedback signal, and to output a comparative output in accordance with a result of the comparison;
- a data memory configured to store preset data that corresponds to division ratios at corresponding addresses that correspond to the division ratios;
- an arithmetic unit configured to update successively the N-bit division ratio at every step whose processing timing is managed by a timer, by adding or subtracting of the preset data read from the data memory to or from the N-bit division ratio in accordance with the comparative output; and at least two systems each including the switching circuit, the piezoelectric transformer, the output converter, the drive-signal generator, the comparator, and the arithmetic unit;

wherein the arithmetic unit is configured to perform an arithmetic operation to make the feedback data value approach the target data value by a negative feedback control, the arithmetic operation to replace, as the preset data, data having a predetermined bit width of M, with M<N, extracted from the successively updated N-bit division ratio, with an M-bit width address, and to read the preset data based on the replaced address, wherein the data memory is a single data memory configured to be shared by the at least two systems, and wherein the at least two systems are configured to alternatively act with sharing the single data memory at the processing timings created by the timer repeatedly and successively from one system to another.

16. The image formation apparatus according to claim 15, wherein the piezoelectric transformers are of different kinds using drive signals with different frequency ranges, and the data memory holds, in different addresses, preset data for the different kinds of piezoelectric transformers.

17. The image formation apparatus according to claim 16 wherein initial setting values of the N-bit division ratios at a start of the negative feedback control are different among the at least two systems using the different kinds of the piezoelectric transformers, respectively.

18. The image formation apparatus according to claim 15, wherein the drive-signal generator includes:

a selector configured to alternatively select one from an S-bit division ratio corresponding to S most significant bits (S<N) of the N-bit division ratio and a one-plus S-bit division ratio obtained by adding one to the S-bit division ratio; and a frequency divider configured to receive the S-bit division ratio selected by the selector, to divide the frequency of the reference clock based on the received S-bit division ratio, and to output a signal with a cycle proportional to the S-bit division ratio, and wherein the selector is configured to select one of the S-bit division ratio and the one-plus S-bit division ratio in accordance with a value of least significant bits of the N-bit division ratio.

19. The power supply apparatus according to claim 15, wherein the data memory holds, in each address, the preset data that makes an amount of change in the output substantially constant across steps of addition/subtraction processing.

20. The power supply apparatus according to claim 15, wherein the output comprises an output voltage.

21. The power supply apparatus according to claim 20, wherein the piezoelectric transformer changes the output voltage, and the output converter detects the output level of the output voltage.

22. The power supply apparatus according to claim 15, wherein the output comprises an output current.

23. The power supply apparatus according to claim 22, wherein the piezoelectric transformer changes the output current, and the output converter detects the output level of the output current.

24. The power supply apparatus according to claim 15, wherein a variable range of the division ratio is defined by a maximum value and a minimum value held in the data memory.

25. The power supply apparatus according to claim 15, wherein the preset data in the data memory is rewritable.

* * * * *